United States Patent
Venugopal et al.

(10) Patent No.: US 12,395,269 B2
(45) Date of Patent: Aug. 19, 2025

(54) TECHNIQUES FOR SPATIAL DOMAIN BASIS FUNCTION REFINEMENT

(71) Applicant: QUALCOMM Incorporated, San Diego, CA (US)

(72) Inventors: Kiran Venugopal, Green Brook, NJ (US); Wooseok Nam, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 433 days.

(21) Appl. No.: 17/945,649

(22) Filed: Sep. 15, 2022

(65) Prior Publication Data

US 2024/0097822 A1    Mar. 21, 2024

(51) Int. Cl.
*H04L 1/06*    (2006.01)
*H04W 16/28*    (2009.01)

(52) U.S. Cl.
CPC .......... *H04L 1/0687* (2013.01); *H04L 1/0693* (2013.01); *H04W 16/28* (2013.01)

(58) Field of Classification Search
CPC ............................. H04W 16/28; H04L 1/0687
See application file for complete search history.

(56) References Cited

U.S. PATENT DOCUMENTS

2020/0220591 A1    7/2020   Zhang et al.
2020/0304178 A1*   9/2020   Wei .................... H04L 5/005

(Continued)

FOREIGN PATENT DOCUMENTS

WO   WO-2020150861 A1   7/2020
WO   WO-2021146829 A1   7/2021
WO   WO-2021147078 A1   7/2021

OTHER PUBLICATIONS

CEWIT: "Discussion on CSI Enhancements for high/Medium UE Velocities and Coherent JT (CJT)", 3GPP TSG RAN WG1 Meeting #110, R1-2207066, 3rd Generation Partnership Project, Mobile Competence Centre, 650, Route Des Lucioles, F-06921 Sophia-Antipolis Cedex , France, vol. RAN WG1, No. Toulouse, France, Aug. 22, 2022-Aug. 26, 2022, Aug. 12, 2022, 6 Pages, XP052275004, Proposal 6.

(Continued)

*Primary Examiner* — Michael Thier
*Assistant Examiner* — Tracy Lauren Colbert
(74) *Attorney, Agent, or Firm* — Dalei Dong; Holland & Hart LLP

(57) ABSTRACT

Techniques and devices for wireless communications are described. A user equipment (UE) may receive a first message from a network entity that indicates a configuration for reporting spatial domain basis function updates to the network entity. The UE may transmit a full channel state information (CSI) report and a partial CSI report to the network entity based on the indicated configuration. The full CSI report may indicate a set of spatial domain basis functions and the partial CSI report may indicate an update for the set of spatial domain basis functions. The update for the set of spatial domain basis functions may be relative to the full CSI report or a previously transmitted partial CSI report. In some examples, the UE may receive a second message from the network entity based on the partial CSI report.

28 Claims, 16 Drawing Sheets

(56) References Cited

U.S. PATENT DOCUMENTS

2023/0198712 A1* 6/2023 Abebe .................. H04L 5/0057
370/329
2024/0187048 A1* 6/2024 Yang .................... H04B 7/0417
2024/0413868 A1* 12/2024 Haghighat .......... H04L 25/0204

OTHER PUBLICATIONS

International Search Report and Written Opinion—PCT/US2023/030785—ISA/EPO—Dec. 22, 2023.

* cited by examiner

TECHNIQUES FOR SPATIAL DOMAIN BASIS FUNCTION REFINEMENT

FIELD OF DISCLOSURE

The present disclosure, for example, relates to wireless communication systems, including techniques for spatial domain basis function refinement.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations, each supporting wireless communication for communication devices, which may be known as user equipment (UE). In some wireless communications systems, a UE may perform channel estimation and report parameters associated with the estimated channel to a network entity. The network entity may use the reported parameters to improve a capacity of the channel through adaptive techniques, such as channel precoding, interference mitigation, and signal rank determination. In some cases, existing techniques for reporting parameters associated with an estimated channel may be deficient.

SUMMARY

The described techniques relate to improved devices and apparatuses that support techniques for spatial domain basis function refinement. For example, the described techniques provide a framework for updating spatial domain basis functions used at a network entity for channel precoding. In some examples, a user equipment (UE) may receive a first message from the network entity that indicates a configuration for reporting spatial domain basis function updates to the network entity. The UE may transmit a full channel state information (CSI) report and a partial CSI report to the network entity based on the indicated configuration. The full CSI report may indicate a set of spatial domain basis functions and the partial CSI report may indicate an update for the set of spatial domain basis functions. In some examples, the update for the set of spatial domain basis functions may be relative to the full CSI report or a previously transmitted partial CSI report. In some examples, the UE may receive a second message from the network entity based on the partial CSI report.

A method for wireless communication at a UE is described. The method may include receiving, from a network entity, a first message indicating a configuration for reporting spatial domain basis function updates to the network entity, transmitting, to the network entity, a full CSI report and a partial CSI report based on the indicated configuration, the full CSI report indicating at least a set of spatial domain basis functions and the partial CSI report indicating an update for the set of spatial domain basis functions relative to the full CSI report or a previous partial CSI report, and receiving, from the network entity, a second message based on the partial CSI report.

An apparatus for wireless communication at a UE is described. The apparatus may include a processor, memory coupled with the processor, and instructions stored in the memory. The instructions may be executable by the processor to cause the apparatus to receive, from a network entity, a first message indicating a configuration for reporting spatial domain basis function updates to the network entity, transmit, to the network entity, a full CSI report and a partial CSI report based on the indicated configuration, the full CSI report indicating at least a set of spatial domain basis functions and the partial CSI report indicating an update for the set of spatial domain basis functions relative to the full CSI report or a previous partial CSI report, and receive, from the network entity, a second message based on the partial CSI report.

Another apparatus for wireless communication at a UE is described. The apparatus may include means for receiving, from a network entity, a first message indicating a configuration for reporting spatial domain basis function updates to the network entity, means for transmitting, to the network entity, a full CSI report and a partial CSI report based on the indicated configuration, the full CSI report indicating at least a set of spatial domain basis functions and the partial CSI report indicating an update for the set of spatial domain basis functions relative to the full CSI report or a previous partial CSI report, and means for receiving, from the network entity, a second message based on the partial CSI report.

A non-transitory computer-readable medium storing code for wireless communication at a UE is described. The code may include instructions executable by a processor to receive, from a network entity, a first message indicating a configuration for reporting spatial domain basis function updates to the network entity, transmit, to the network entity, a full CSI report and a partial CSI report based on the indicated configuration, the full CSI report indicating at least a set of spatial domain basis functions and the partial CSI report indicating an update for the set of spatial domain basis functions relative to the full CSI report or a previous partial CSI report, and receive, from the network entity, a second message based on the partial CSI report.

Some examples of the method, apparatuses, and non-transitory computer-readable medium described herein may further include operations, features, means, or instructions for receiving, from the network entity, a third message indicating for the UE to report the update for the set of spatial domain basis functions, where transmitting the partial CSI report may be based on the received third message.

In some examples of the method, apparatuses, and non-transitory computer-readable medium described herein, receiving the first message may include operations, features, means, or instructions for receiving an indication to report the update for the set of spatial domain basis functions relative to the full CSI report or the previous partial CSI report, where transmitting the partial CSI report indicating the update may be based on the received indication.

Some examples of the method, apparatuses, and non-transitory computer-readable medium described herein may further include operations, features, means, or instructions for transmitting, to the network entity, a third message requesting to report the update for the set of spatial domain basis functions, where transmitting the partial CSI report may be based on the transmitted third message.

In some examples of the method, apparatuses, and non-transitory computer-readable medium described herein, transmitting the partial CSI report may include operations, features, means, or instructions for transmitting an indication of a set of offsets to be applied to the set of spatial domain basis functions, where each offset of the set of offsets corresponds to a respective spatial domain basis function of the set of spatial domain basis functions, and where the set of offsets indicates the update for the set of spatial domain basis functions.

In some examples of the method, apparatuses, and non-transitory computer-readable medium described herein, each offset of the set of offsets identifies a first value corresponding to an azimuthal angle associated with the respective spatial domain basis function and a second value corresponding to a zenith angle associated with the respective spatial domain basis function.

In some examples of the method, apparatuses, and non-transitory computer-readable medium described herein, transmitting the partial CSI report may include operations, features, means, or instructions for transmitting an indication of a shift in a position of a set of coefficients associated with the set of spatial domain basis functions, where the shift in the position of the set of coefficients indicates the update for the set of spatial domain basis functions.

In some examples of the method, apparatuses, and non-transitory computer-readable medium described herein, the set of coefficients may have a non-zero value.

In some examples of the method, apparatuses, and non-transitory computer-readable medium described herein, transmitting the indication of the shift in the position of the set of coefficients may include operations, features, means, or instructions for transmitting a set of bits indicating a value of an index corresponding to the shift in the position of the set of coefficients.

In some examples of the method, apparatuses, and non-transitory computer-readable medium described herein, transmitting the indication of the shift in the position of the set of coefficients may include operations, features, means, or instructions for transmitting an indication of a set of differential coefficients, where each differential coefficient of the set of differential coefficients correspond to a coefficient difference relative to a respective coefficient of the set of coefficients, and where the coefficient difference indicates a shift in a value and a shift in a position of the respective coefficient of the set of coefficients.

In some examples of the method, apparatuses, and non-transitory computer-readable medium described herein, transmitting the full CSI report and the partial CSI report may include operations, features, means, or instructions for transmitting the full CSI report at a first time instance and the partial CSI report at a second time instance subsequent to the first time instance, where the second time instance may be based on a prediction performed at the UE.

In some examples of the method, apparatuses, and non-transitory computer-readable medium described herein, the prediction may be based on a CSI measurement rate configured at the UE, a CSI reporting rate configured at the UE, or both.

In some examples of the method, apparatuses, and non-transitory computer-readable medium described herein, transmitting the partial CSI report may include operations, features, means, or instructions for receiving, from the network entity, a third message indicating a set of multiple sets of coefficients, where each set of coefficients of the indicated set of multiple sets of coefficients corresponds to a respective set of spatial domain basis functions and transmitting, to the network entity based on the received third message, an indication of one or more sets of coefficients of the indicated set of multiple sets of coefficients, where the one or more sets of coefficients indicates the update for the set of spatial domain basis functions.

In some examples of the method, apparatuses, and non-transitory computer-readable medium described herein, transmitting the indication of the one or more sets of coefficients may include operations, features, means, or instructions for transmitting an indication of a set of differential coefficients, where each differential coefficient of the set of differential coefficients indicates a coefficient difference between a coefficient of a first set of coefficients of the indicated set of multiple sets of coefficients and a respective coefficient of a second set of coefficients of the indicated set of multiple sets of coefficients.

A method for wireless communication at a network entity is described. The method may include outputting a first message indicating a configuration for reporting spatial domain basis function updates to the network entity, obtaining a full CSI report and a partial CSI report based on the indicated configuration, the full CSI report indicating at least a set of spatial domain basis functions and the partial CSI report indicating an update for the set of spatial domain basis functions relative to the full CSI report or a previous partial CSI report, and outputting a second message based on the partial CSI report.

An apparatus for wireless communication at a network entity is described. The apparatus may include a processor, memory coupled with the processor, and instructions stored in the memory. The instructions may be executable by the processor to cause the apparatus to output a first message indicating a configuration for reporting spatial domain basis function updates to the network entity, obtain a full CSI report and a partial CSI report based on the indicated configuration, the full CSI report indicating at least a set of spatial domain basis functions and the partial CSI report indicating an update for the set of spatial domain basis functions relative to the full CSI report or a previous partial CSI report, and output a second message based on the partial CSI report.

Another apparatus for wireless communication at a network entity is described. The apparatus may include means for outputting a first message indicating a configuration for reporting spatial domain basis function updates to the network entity, means for obtaining a full CSI report and a partial CSI report based on the indicated configuration, the full CSI report indicating at least a set of spatial domain basis functions and the partial CSI report indicating an update for the set of spatial domain basis functions relative to the full CSI report or a previous partial CSI report, and means for outputting a second message based on the partial CSI report.

A non-transitory computer-readable medium storing code for wireless communication at a network entity is described. The code may include instructions executable by a processor to output a first message indicating a configuration for reporting spatial domain basis function updates to the network entity, obtain a full CSI report and a partial CSI report based on the indicated configuration, the full CSI report indicating at least a set of spatial domain basis functions and the partial CSI report indicating an update for the set of spatial domain basis functions relative to the full CSI report or a previous partial CSI report, and output a second message based on the partial CSI report.

Some examples of the method, apparatuses, and non-transitory computer-readable medium described herein may further include operations, features, means, or instructions for outputting a third message indicating for a UE to report the update for the set of spatial domain basis functions, where obtaining the partial CSI report may be based on outputting the third message.

In some examples of the method, apparatuses, and non-transitory computer-readable medium described herein, outputting the first message may include operations, features, means, or instructions for outputting an indication for a UE to report the update for the set of spatial domain basis functions relative to the full CSI report or the previous partial CSI report, where obtaining the partial CSI report indicating the update may be based on outputting the indication.

Some examples of the method, apparatuses, and non-transitory computer-readable medium described herein may further include operations, features, means, or instructions for obtaining a third message including a request, from a UE, to report the update for the set of spatial domain basis functions, where obtaining the partial CSI report may be based on outputting the third message.

In some examples of the method, apparatuses, and non-transitory computer-readable medium described herein, obtaining the partial CSI report may include operations, features, means, or instructions for obtaining an indication of a set of offsets to be applied to the set of spatial domain basis functions, where each offset of the set of offsets corresponds to a respective spatial domain basis function of the set of spatial domain basis functions, and where the set of offsets indicates the update for the set of spatial domain basis functions.

In some examples of the method, apparatuses, and non-transitory computer-readable medium described herein, each offset of the set of offsets identifies a first value corresponding to an azimuthal angle associated with the respective spatial domain basis function and a second value corresponding to a zenith angle associated with the respective spatial domain basis function.

In some examples of the method, apparatuses, and non-transitory computer-readable medium described herein, obtaining the partial CSI report may include operations, features, means, or instructions for obtaining an indication of a shift in a position of a set of coefficients associated with the set of spatial domain basis functions, where the shift in the position of the set of coefficients indicates the update for the set of spatial domain basis functions.

In some examples of the method, apparatuses, and non-transitory computer-readable medium described herein, the set of coefficients may have a non-zero value.

In some examples of the method, apparatuses, and non-transitory computer-readable medium described herein, obtaining the indication of the shift in the position of the set of coefficients may include operations, features, means, or instructions for obtaining a set of bits indicating a value of an index corresponding to the shift in the position of the set of coefficients.

In some examples of the method, apparatuses, and non-transitory computer-readable medium described herein, obtaining the indication of the shift in the position of the set of coefficients may include operations, features, means, or instructions for obtaining an indication of a set of differential coefficients, where each differential coefficient of the set of differential coefficients correspond to a coefficient difference relative to a respective coefficient of the set of coefficients, and where the coefficient difference indicates a shift in a value and a shift in a position of the respective coefficient of the set of coefficients.

In some examples of the method, apparatuses, and non-transitory computer-readable medium described herein, obtaining the full CSI report and the partial CSI report may include operations, features, means, or instructions for obtaining the full CSI report at a first time instance and the partial CSI report at a second time instance subsequent to the first time instance, where the second time instance may be based on the first time instance and a prediction performed at a UE.

In some examples of the method, apparatuses, and non-transitory computer-readable medium described herein, the prediction may be based on a CSI measurement rate configured at the UE, a CSI reporting rate configured at the UE, or both.

In some examples of the method, apparatuses, and non-transitory computer-readable medium described herein, obtaining the partial CSI report may include operations, features, means, or instructions for outputting a third message indicating a set of multiple sets of coefficients, where each set of coefficients of the indicated set of multiple sets of coefficients corresponds to a respective set of spatial domain basis functions and obtaining, based on outputting the third message, an indication of one or more sets of coefficients of the indicated set of multiple sets of coefficients, where the one or more sets of coefficients indicates the update for the set of spatial domain basis functions.

In some examples of the method, apparatuses, and non-transitory computer-readable medium described herein, obtaining the indication of the one or more sets of coefficients may include operations, features, means, or instructions for obtaining an indication of a set of differential coefficients, where each differential coefficient of the set of differential coefficients indicates a coefficient difference between a coefficient of a first set of coefficients of the indicated set of multiple sets of coefficients and a respective coefficient of a second set of coefficients of the indicated set of multiple sets of coefficients.

DETAILED DESCRIPTION

Figure 1:
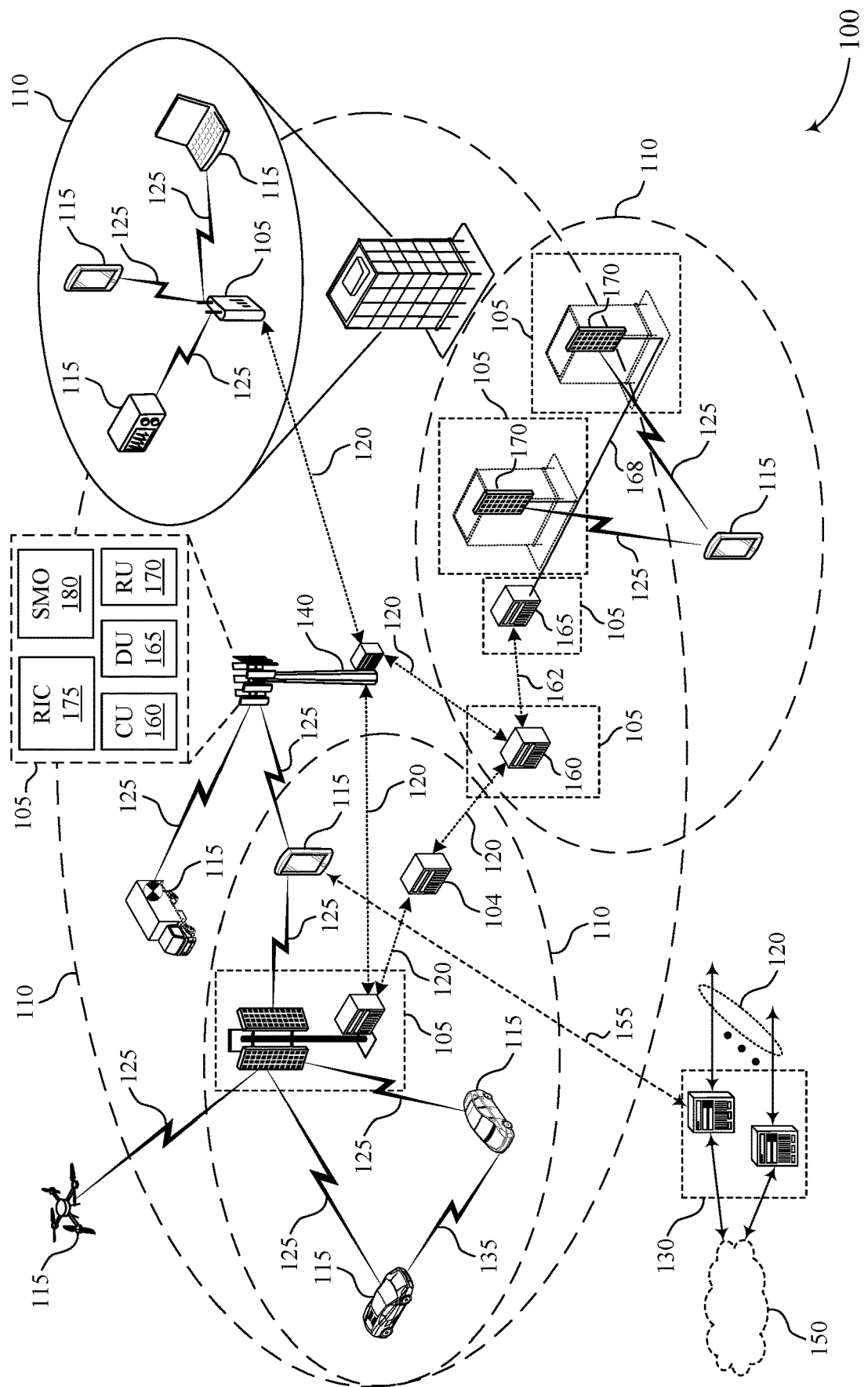
FIGS. 1 and 2 each illustrate an example of a wireless communications system that supports techniques for spatial domain basis function refinement in accordance with various aspects of the present disclosure.

A wireless multiple-access communications system may include one or more network entities, each simultaneously supporting communication for multiple communication devices, which may be otherwise known as user equipment (UE). In some examples, such communication may be carried out via beamforming using multiple antennas at a transmitting device (e.g., one of a network entity and a UE) and multiple antennas at a receiving device (e.g., the other of the network entity and the UE). In some examples, the UE and the network entity may share information regarding a quality of a communication channel (e.g., used for transmitting the communications) to improve signal reliability and communication efficiency. For example, the communications system may support a format for reporting channel state feedback in which the UE may perform channel estimation and report one or more parameters associated with the estimated channel to the network entity. In some examples, the reported parameters may be referred to as channel state information (CSI) and may include a layer indicator (LI), a channel quality indicator (CQI), a precoding matrix indicator (PMI), and a rank indicator (RI), among other examples. In such examples, precoding performed at the network entity (e.g., to transmit a signal to the UE) may be determined at the network entity based on the CSI measured at the UE and reported to the network entity. That is, the network entity may determine a precoding matrix to use for precoding based on CSI reported to the network entity from the UE.

In some examples, however, the UE may travel at relatively high speeds, such that the radio conditions experienced at the UE (e.g., the channel conditions) may change relatively quickly compared to a rate at which the network entity may obtain CSI from the UE. As such, a precoding matrix determined at the network entity may become outdated relatively quickly and degrade the performance of communications (e.g., downlink communications) between the UE and the network entity. To improve communication performance (e.g., while reducing overhead), the UE may transmit a full CSI report and one or multiple partial CSI reports to the network entity. The full CSI report may include a set of spatial domain basis functions and a set of channel coefficients associated with the set of spatial domain basis functions. Additionally, or alternatively, a partial CSI report may indicate a change in the set of channel coefficients. In some examples, however, the change in the set of channel coefficients may fail to capture a change (e.g., a decorrelation) of the spatial domain basis functions (e.g., over time due to the change in channel conditions), which may lead to an outdated precoding matrix and reduced performance of downlink communications between the network entity and the UE.

Various aspects of the present disclosure relate to techniques for spatial domain basis function refinement, and more specifically, to a framework for updating spatial domain basis functions used at a network entity. For example, the network entity may indicate, to the UE, a configuration for reporting spatial domain basis function updates to the network entity. In some examples, based on the indicated configuration, the UE may transmit a full CSI report and one or multiple partial CSI reports to the network entity. In such examples, the full CSI report may indicate a set of spatial domain basis functions. Additionally, or alternatively, the full CSI report may indicate a set of coefficients (e.g., channel coefficients) associated with the set of spatial domain basis functions. In some examples, the partial CSI report may indicate an update for the set of spatial domain basis functions. For example, the partial CSI report may indicate an update for the set of spatial domain basis functions relative to the full CSI report (e.g., relative to the set of spatial domain basis functions indicated using the full CSI report) or relative to a previously transmitted partial CSI report (e.g., relative to a previously indicated update for the set of spatial domain basis functions indicated using the full CSI report).

In some examples, the UE may indicate the update for the spatial domain basis functions via one or more offsets to be applied to the spatial domain basis functions. For example, the UE may indicate, to the network entity, an offset to be applied to each spatial domain basis function of the set of spatial domain basis functions. Additionally, or alternatively, the UE may indicate the update via a shift in a position of one or more channel coefficients. For example, the UE may indicate, to the network entity, a shift in a position of non-zero coefficients (e.g., one or more channel coefficients included in the set of channel coefficients that have a non-zero value). In such an example, the network entity may determine the update for the spatial domain basis functions based on the indicated shift in the position of the non-zero coefficients.

Various aspects of the subject matter described herein may be implemented to realize one or more of the following potential advantages. For example, the techniques employed by the described communication devices may provide benefits and enhancements to wireless communication devices operating within the network, including improved reliability of channel state feedback reporting within the wireless communication system. In some examples, operations performed by the described communication devices to improve the reliability of channel state feedback reporting may include configuring a UE to update spatial domain basis functions used at a network entity (e.g., for communications with the UE). In some other implementations, operations performed by the described wireless communication devices may also support improvements to user experience and higher data rates, among other benefits. Aspects of the disclosure are initially described in the context of wireless communications systems and process flows. Aspects of the disclosure are further illustrated by and described with reference to apparatus diagrams, system diagrams, and flowcharts that relate to techniques for spatial domain basis function refinement.

FIG. 1 illustrates an example of a wireless communications system 100 that supports techniques for spatial domain basis function refinement in accordance with various aspects of the present disclosure. The wireless communications system 100 may include network entities 105, UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more of the communication links 125 (e.g., a radio frequency access link). For example, a network entity 105 may support a coverage area 110 (e.g., a geographic coverage area) over which the UEs 115 and the network entity 105 may establish one or more of the communication links 125. The coverage area 110 may be an example of a geographic area over which a network entity 105 and a UE 115 may support the communication of signals according to one or more radio access technologies (RATs).

The UEs 115 may be dispersed throughout the coverage area 110 of the wireless communications system 100, and each UE 115 may be stationary, or mobile, or both at different times. The UEs 115 may be devices in different forms or having different capabilities. Some examples of the UEs 115 are illustrated in FIG. 1. The UEs 115 described herein may be capable of supporting communications with various types of devices, such as others of the UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more of the network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO), such as a SMO 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, radio frequency functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more of the DUs 165 or the RUs 170, which may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more of the DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by a respective network entity of the network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., IAB nodes 104) may be partially controlled by each other. One or more of the IAB nodes 104 may be referred to as a donor entity or an IAB donor. One or more of the DUs 165 or one or more RUs 170 may be partially controlled by one or more of the CUs 160 associated with a donor network entity (e.g., a network entity 105, a base station 140). The one or more donor network entities (e.g., one or more of the network entities 105, one or more IAB donors) may be in communication with an additional one or more of the network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node of the IAB nodes 104 used for access via the DU 165 of the IAB node of the IAB nodes 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more of the IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for spatial domain basis function refinement as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as others of the UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more of the communication links 125 (e.g., an access link) using resources associated with one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via another one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an radio frequency spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in a time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some examples of the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or radio frequency spectrum band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple of the UEs 115 and UE-specific search space sets for sending control information to a UE 115.

In some examples, a network entity 105 (e.g., a base station 140, an RU 170) may be movable and therefore provide communication coverage for a moving coverage area (e.g., the coverage area 110). In some examples, different coverage areas (e.g., different examples of the coverage area 110) associated with different technologies may overlap, but the different coverage areas may be supported by the network entity 105 (e.g., a same network entity). In some other examples, the overlapping coverage areas associated with different technologies may be supported by different network entities of the network entities 105. The wireless communications system 100 may include, for example, a heterogeneous network in which different types of the network entities 105 provide coverage for various coverage areas (e.g., various examples of the coverage area 110) using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or commercial applications. The terms ultra-reliable, low-latency, and ultra-reliable low-latency may be used interchangeably herein.

In some examples, a UE 115 may be configured to support communicating directly with one or more others of the UEs 115 via a device-to-device (D2D) communication link 135 (e.g., in accordance with a peer-to-peer (P2P), D2D, or sidelink protocol). In some examples, one or more of the UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more of the UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the others of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more radio frequency spectrum bands, which may be in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), an unlicensed radio frequency spectrum band radio access technology, or an NR technology using an unlicensed radio frequency spectrum band such as the 5 GHz industrial, scientific, and medical (ISM) band. While operating using unlicensed radio frequency spectrum bands, devices such as the network entities 105 and the UEs 115 may employ carrier sensing for collision detection and avoidance. In some examples, operations using unlicensed radio frequency spectrum bands may be based on a carrier aggregation configuration in conjunction with component carriers operating using a licensed radio frequency spectrum band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support radio frequency beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along some orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a receiving device, may be transmitted by transmitting device (e.g., a network entity 105, a UE 115) along a single beam direction (e.g., a direction associated with the receiving device, such as a network entity 105 or a UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a CSI reference signal (CSI-RS)), which may be precoded or unprecoded. The UE 115 may provide feedback for beam selection, which may be a PMI or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, a UE 115 may travel at relatively high speeds, such that the radio conditions experienced at the UE 115 may change relatively quickly compared to a rate at which a network entity 105 may obtain CSI from the UE 115. As such, the UE 115 may transmit a full CSI report and one or multiple partial CSI reports to the network entity 105. The full CSI report may include a set of spatial domain basis functions and a set of coefficients (e.g., channel coefficients) associated with the set of spatial domain basis functions. Additionally, or alternatively, a partial CSI report may indicate a change in the set of channel coefficients included in the full CSI report. In some examples, however, the change in the set of channel coefficients may fail to capture a change (e.g., a decorrelation) of the spatial domain basis functions, which may lead to an outdated precoding matrix and may reduce the performance of downlink communications between the network entity 105 and the UE 115.

In some examples, the wireless communications system 100 may support one or more techniques for spatial domain basis function refinement. For example, the network entity 105 may indicate, to the UE 115, a configuration for reporting spatial domain basis function updates to the network entity 105. In some examples, based on the configuration, the UE 115 may transmit a full CSI report and one or multiple partial CSI report to the network entity 105. In such examples, the full CSI report may indicate a set of spatial domain basis functions. Additionally, or alternatively, the full CSI report may indicate a set of channel coefficients associated with the set of spatial domain basis functions. In some examples, the partial CSI report may indicate an update for the set of spatial domain basis functions. For example, the partial CSI report may indicate an update for the set of spatial domain basis functions relative to the full CSI report or relative to another (e.g., a previously transmitted) partial CSI report. The UE 115 may receive, from the network entity 105, a message based on the partial CSI report. In some examples, configuring the UE 115 to update the set of spatial domain basis functions may improve the reliability of communication between the UE 115 and the network entity 105, among other possible benefits.

Figure 2:
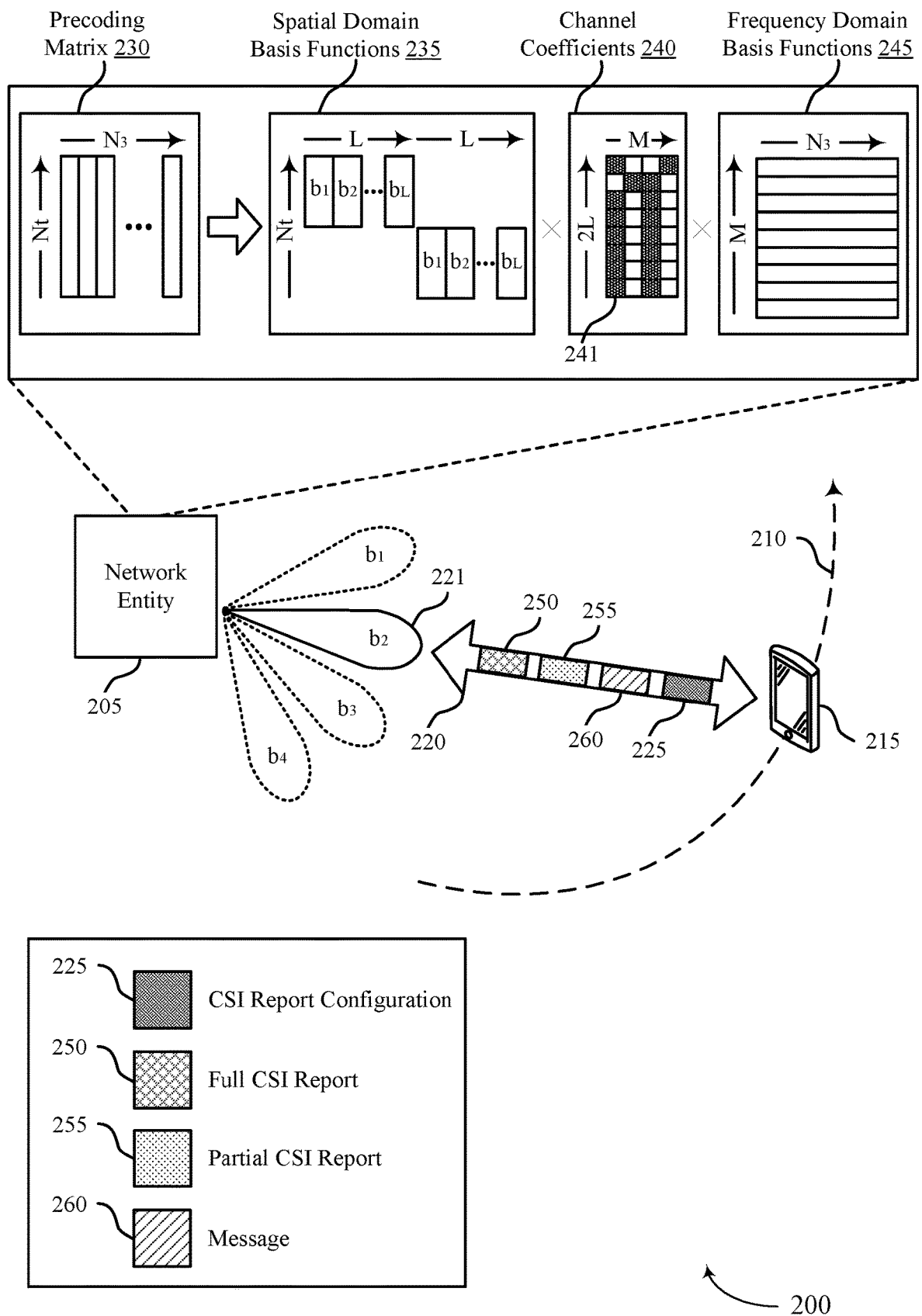

FIG. 2 illustrates an example of a wireless communications system 200 that supports techniques for spatial domain basis function refinement in accordance with various aspects of the present disclosure. In some examples, the wireless communications system 200 may implement or be implemented by one or more aspects of the wireless communications system 100. For example, the wireless communications system 200 may include a UE 215, which may be an example of a UE 115 as described with reference to FIG. 1. The wireless communications system 200 may also include a network entity 205, which may be an example of one or more of the network entities 105 (e.g., a CU, a DU, an RU, a base station, an IAB node, or one or more other network nodes) as described with reference to FIG. 1. The network entity 205 and the UE 215 may communicate using a communication link 220, which may each be an example of a communication link 125 as described with reference to FIG. 1. The wireless communications system 200 may include features for improved communications between the network entity 205 and the UE 215, among other possible benefits.

The wireless communications system 200 may support MIMO communications to enable increased throughput within the wireless communications system 200. In some examples, to improve signal reliability and efficiency for MIMO communications, the network entity 205 and the UE 215 may share (e.g., exchange) information regarding the quality of a communication channel for the MIMO communications. For example, the UE 215 and the network entity 205 may support a framework for reporting channel state feedback in which the UE 215 may perform channel estimation (e.g., for a communication channel) and report CSI associated with the estimated communication channel to the network entity 205. In some examples, precoding performed by the network entity 205 (e.g., to transmit a signal to the UE 215) may be determined by the network entity 205 based on the reported CSI. For example, in response to receiving CSI from the UE 215, the network entity 205 may determine a precoder (e.g., a precoding matrix 230) to use for precoding signals to be transmitted to the UE 215. That is, the precoding matrix 230 (e.g., determined using the reported CSI) may be used to generate a beam 221 (e.g., associated with an index $b_2$) for communications with the UE 215. For example, as the UE 215 travels along the path 210, channel conditions experienced at UE 215 may change and, as such, the precoding matrix 230 used at the network entity 205 may be updated.

In some examples, however, the UE 215 may travel at relatively high velocities (e.g., along a path 210), such that channel conditions of the UE 215 may change relatively quickly compared to a rate at which the network entity 205 may obtain CSI from the UE 215 (e.g., due to a propagation delay associated with signaling an indication of the CSI to the network entity 205). As such, the precoding matrix 230 selected at the network entity 205 (e.g., based on the reported CSI) may become outdated relatively quickly and degrade the performance of communications between the network entity 205 and the UE 215.

In some examples, to increase the reliability of communications for relatively high (or relatively medium) UE velocities, the wireless communications system may support one or more techniques for refining codebooks (e.g., Type-II codebooks) that may be used for CSI reporting. For example, a codebook may be used (e.g., at the network entity 205 and the UE 215) to determine a size of the precoding matrix 230 that may be used at the network entity 205 for precoding transmissions, such as MIMO transmissions using one or multiple data streams (e.g., one or multiple layers (l)). In some examples, the size (e.g., dimensions) of the precoding matrix 230 may depend on a quantity of antennas (e.g., transmit antennas at the network entity 205) and a quantity of precoding matrices (e.g., a quantity of PMI) configured at the network entity 205. Additionally, or alternatively, a quantity of layers (l) used at the network entity 205 (e.g., for a downlink transmission) may be configured at the UE 215 (e.g., via signaling from the network entity 205, such as RRC signaling). In some examples, the size of the precoding matrix 230 may be determined in accordance with the following Equation 1:

$$N_t \times N_3 \qquad (1)$$

in which $N_t$ may correspond to the quantity of antennas (e.g., active antenna ports at the network entity 205) and $N_3$ may correspond to the quantity of PMI (e.g., a quantity of radio frequency spectrum bands the network entity 205 may precode over). In some examples, the quantity of PMI may be determined (e.g., at the network entity 205) based on a quantity of CQI sub-bands and a quantity of PMI sub-bands (e.g., per CQI sub-band). In some examples, a CQI sub-band (or a PMI sub-band) may correspond to a portion of a bandwidth represented by the reported CQI (or PMI). In some examples, the quantity of CQI sub-bands and the quantity of PMI sub-bands may be configured at the UE 215 (e.g., via signaling from the network entity 205, such as RRC signaling).

In some examples, for transmit layer (l), the precoding matrix 230 (e.g., a compressed Type II precoder ($W^{(l)}$)) may exploit a sparsity of the spatial domain and the frequency domain. For example, a CSI formula for a Type II codebook may be used to indicate the precoding matrix 230 using a structure described in accordance with Equation 2:

$$W^{(l)} = W_1 W_{2,l} W_{f,l}^H \qquad (2)$$

in which $W^{(l)}$ may represent the precoding matrix 230, $W_1$ may represent spatial domain basis functions 235, $W_{2,l}$ may represent channel coefficients 240 (e.g., spatial frequency domain channel coefficients), and $W_f^H$ may represent frequency domain basis functions 245. In some examples, the precoding matrix 230 (e.g., represented using the matrix $W^{(l)}$) may include a quantity of rows ($N_t$) that may be described in accordance with Equation 3:

$$N_t = 2N_1 N_2 \qquad (3)$$

in which $N_1$ may represent the spatial domain and $N_2$ may represent a quantity of antenna ports at the network entity 205. Additionally, or alternatively, the precoding matrix 230 may include a quantity of columns ($N_3$) that may each represent a frequency domain compression unit (e.g., including resource blocks or reporting sub-bands).

In some examples, the spatial domain basis functions 235 (e.g., a spatial domain precoder represented using the matrix $W_1$) may include spatial domain basis functions that consider (e.g., include, account for) a quantity of beams (L) (e.g., to be used at the network entity 205). That is, the matrix $W_1$ may include a quantity of spatial domain basis functions that may be based on (e.g., correspond to) a quantity of beams (L) at the network entity 205. For example, the spatial domain basis functions 235 may include a quantity of columns (L) per polarization group (e.g., about 2L beams). In such an example, an i-th column of the matrix $W_1$ may correspond to the i-th beam ($b_i$). In some examples, the spatial domain basis functions 235 (e.g., the matrix $W_1$) may be common to multiple layers (l). That is, for some transmissions (e.g., multi-stream MIMO transmissions) a same set of spatial domain basis functions may be used for multiple (e.g., each) layer (l). In some examples, the spatial domain basis functions 235 (e.g., basis vectors in the spatial domain, discrete Fourier transform basis vectors) may be represented in accordance with the following Equation 4:

$$N_t \times 2L \qquad (4)$$

in which L beams may be selected (e.g., at the network entity 205) for each polarization group. Additionally, or alternatively, the parameter L may be configured at the UE 215 (e.g., via signaling from the network entity 205, such as via RRC signaling). In some examples, CSI reported from the UE 215 to the network entity 205 may be based on the parameter L (e.g., and one or more other parameters to be used for the downlink transmission, such as the quantity of CQI sub-bands, the quantity of PMI sub-bands and the quantity of layers (l)).

In some examples, the channel coefficients 240 (e.g., represented using the matrix $W_{2,l}$) may include a linear combination of coefficients (e.g., amplitude and co-phasing coefficients), in which each element (e.g., of the matrix $W_{2,l}$) may represent the coefficient of a tap for a beam. Additionally, or alternatively, channel coefficients 240 (e.g., the matrix $W_{2,l}$) may be layer-specific. That is, for some transmissions (e.g., multi-stream MIMO transmissions), multiple (e.g., different) sets of channel coefficients 240 may be uses for multiple (e.g., different) layers (l). In some examples, such as for a Type II precoding matrix composition for layer (l), a row of the matrix $W_{2,l}$ may correspond to a spatial beam and in the matrix $W_1$ and an entry (e.g., of the matrix $W_{2,l}$) may represent the coefficient of a tap for the spatial beam. As such, a size of the coefficient matrix $W_{2,l}$, (e.g., the channel coefficients 240) may be represented in accordance with the following Equation 5:

$$2L \times M \quad (5)$$

in which the parameter 2L may correspond to the quantity of spatial domain basis functions 235 and the parameter M may correspond to the quantity of frequency domain basis functions 245. That is, columns of the matrix $W_{2,l}$ may correspond to the frequency domain basis functions 245 and rows of the matrix $W_{2,l}$ may correspond to the spatial domain basis functions 235.

In some examples, the parameter M may be configured (e.g., RRC configured) at the network entity 205 and the UE 215. For example, the network entity may indicate the parameter M to the UE 215 via RRC signaling. Additionally, or alternatively, M may be based on (e.g., may be a function of) RI. Additionally, or alternatively, the channel coefficients 240 (e.g., represented using the matrix $W_{2,l}$, which may including 2L×M elements) may include a quantity (e.g., a maximum quantity or an otherwise suitable quantity) of non-zero coefficients 241 (e.g., $K_0$ non-zero coefficients 241 for a layer and $2K_0$ non-zero coefficients 241 for multiple layers). That is, for a single layer the UE 215 may report $K_0$ non-zero coefficients 241 and across multiple (e.g., all) layers the UE 215 may report $2K_0$ non-zero coefficients 241 (e.g., within the channel coefficients 240) to the network entity 205.

In some examples, an entry in the matrix $W_{2,l}$ may correspond to a row of the matrix $W_{f,l}^H$. For example, the frequency domain basis functions 245 may include basis vectors (e.g., basis vectors in the frequency domain, discrete Fourier transform basis vectors) used to perform compression in the frequency domain. That is, each row of the matrix $W_{f,l}^H$ may correspond to a basis vector. Additionally, or alternatively, the frequency domain basis functions 245 (e.g., represented using the matrix $W_{f,l}^H$) may be layer-specific. That is, for some transmissions (e.g., multi-stream MIMO transmissions), multiple (e.g., different) sets of frequency domain basis functions 245 may be uses for multiple (e.g., different) layers (l). In some examples, a size of the frequency domain basis functions 245 may be represented in accordance with the following Equation 6:

$$M \times N_3. \quad (6)$$

In some examples, the UE 215 may report an update for the precoding matrix 230, for example based on channel conditions experienced at the UE 215. For example, the UE 215 may report an update for the precoding matrix 230 using (e.g., in terms of) a modification (e.g., change, update) for the channel coefficients 240 (e.g., for the matrix $W_{2,l}$). That is, for relatively high or relatively medium UE velocities, the UE 215 may modify the matrix $W_{2,l}$ and may refrain from modifying the matrix $W_1$ and the matrix WA (e.g., in the codebook). That is, the UE 215 may modify values of the matrix $W_{2,l}$ (e.g., based on channel conditions experienced at the UE 215) and report the modified values to the network entity 205, such that the network entity 205 may update (e.g., adapt) the precoding matrix 230. For example, at a first time instance ($t_0$) the UE 215 may report an update for the precoding matrix 230, such that the precoding matrix 230 may be described in accordance with the following Equation 7:

$$W^{(l)}(t_0) = W_1 W_{2,l}(t_0) W_{f,l}^H \quad (7)$$

At a second time instance ($t_1$) (e.g., subsequent to the first time instance), the UE 215 may report an update for the precoding matrix 230, such that the precoding matrix 230 may be described in accordance with the following Equation 8:

$$W^{(l)}(t_1) = W_1 W_{2,l}(t_1) W_{f,l}^H \quad (8)$$

and, at a third time instance ($t_2$) (e.g., subsequent to the first time instance and the second time instance), the UE 215 may report an update for the precoding matrix 230, such that the precoding matrix 230 may be described in accordance with the following Equation 9:

$$W^{(l)}(t_2) = W_1 W_{2,l}(t_2) W_{f,l}^H \quad (9)$$

In some examples, reporting values of the $W_{2,l}$ matrix (e.g., the channel coefficients 240) at multiple (e.g., different) time instances, may enable the network entity 205 to track modifications for the precoding matrix 230, such that the precoding matrix 230 determined at the network entity 205 may be suitable for channel conditions experienced at the UE 215. In such examples, the UE 215 may report same values for the spatial domain basis functions 235 (e.g., represented as the matrix $W_1$) and same values for the frequency domain basis functions 245 (e.g., represented as the matrix $W_{f,l}^H$) irrespective of the time instance in which they are reported. That is, the spatial domain basis functions 235 and the frequency domain basis functions 245 may be static over a duration including the first time instance, the second time instance, and the third time instance.

In some examples, the UE 215 update the precoding matrix 230 using a channel coefficient difference (e.g., relative to previously reported values of the channel coefficients 240) at multiple time instances. That is, the UE 215 may report a set of the channel coefficients 240 (e.g., the matrix $W_{2,l}$) or a change in the set of the channel coefficients 240 (e.g., a matrix $\Delta W_{2,l}$) at multiple time instances. In some examples, if the UE 215 reports a change in the set of the channel coefficients 240 (e.g., the matrix $\Delta W_{2,l}$) at multiple time instances, the elements included in the matrix $\Delta W_{2,l}$ may correspond to differential channel coefficients (e.g., delta reporting, a partial CSI update). For example, a differential channel coefficient included in the matrix $\Delta W_{2,l}$ may correspond to a channel coefficient difference relative to the respective channel coefficient of the $W_{2,l}$ matrix.

Additionally, or alternatively, the channel coefficients 240 (or the precoding matrix 230) may be determined (e.g., expressed as) a function of a time domain or a Doppler domain (e.g., Doppler frequency). In such examples, the UE 215 may report the precoding matrix 230 (e.g., using a PMI), such that the precoding matrix 230 may include a time domain representation of the matrix $W_{2,l}$. As such, the network entity 205 may determine modifications for (e.g., may adapt) the precoding matrix 230 over a duration. In some other examples, the precoding matrix 230 may be determined (e.g., expressed, described) in accordance with a state space representation in which the precoding matrix 230 may be updated over the duration using a recursive equation. For example, the UE 215 may report feedback (e.g., may transmit a CSI report) regarding the channel coefficients 240 to the network entity 205 (e.g., a gNB) and, based on a model (e.g., an alternative model, the state space representation, a state space model), the network entity 205 may determine (e.g., compute) the precoding matrix 230. That is, the network entity 205 may track CSI associated with the UE 215 based on a recursive equation and may update the precoding matrix 230 based on the tracked CSI (e.g., one or more observations).

In some examples, a change in the set of channel coefficients (e.g., reported from the UE 215) may fail to capture a change (e.g., a decorrelation) of the spatial domain basis functions 235 and may lead to reduced performance of downlink communications between the network entity 205 and the UE 215. For example (e.g., for frequency range 2 (FR2) and relatively higher radio frequency spectrum bands, such as radio frequency spectrum bands which include millimeter wavelengths), the spatial domain basis functions 235 (e.g., selected at the UE 215) may become decorrelated over a duration due to changing channel conditions. As such, the UE 215 may adapt the spatial domain basis functions 235 over a duration based on channel conditions (e.g., based on the Doppler frequency). For example, to increase the reliability of the precoding matrix 230, the UE 215 may report a modification for the spatial domain basis functions 235 (e.g., in addition to a modification for the channel coefficients 240) based on channel conditions experienced at the UE 215.

In some examples, techniques for spatial domain basis function refinement, as described herein, may provide one or more enhancements to CSI reporting in the wireless communications system 200 (e.g., may provide for evolved MIMO communications including one or more CSI enhancements). For example, such techniques may provide one or more CSI reporting enhancements for relatively high or relatively medium UE velocities by exploiting time domain correlation or Doppler domain information (or both), for example to assist precoding (e.g., downlink precoding or uplink precoding) for one or more frequency ranges (e.g., frequency range 1 (FR1), FR2). That is, the wireless communications system 200 may support an enhanced framework for CSI reporting in which the network entity 205 may use the time domain correlation information or Doppler domain information (or both) to adapt the precoding matrix 230 used at the network entity 205 (e.g., for data transmissions). In some examples, techniques for spatial domain basis function refinement, as described herein, may provide one or more refinements to codebooks, such as Type-II codebooks (e.g., without modification to spatial domain and frequency domain basis functions).

Additionally, or alternatively, such techniques may enable UE reporting of time domain channel properties, for example measured via reference signals (e.g., CSI-RSs) for tracking. In some examples, techniques for spatial domain basis function refinement may provide one or more enhancements of CSI acquisition for coherent-joint-transmission (CJT) using multi-TRP (mTRP), such as up to 4 TRPs. Such techniques may be used with one or multiple frequency ranges (e.g., FR1, FR2). In some examples, such enhancements for CSI acquisition may include backhaul (e.g., ideal backhaul) communications and synchronization (e.g., between TRPs), as well as a same quantity of antenna ports across multiple TRPs. For example, Type-II codebook refinements for CJT using mTRP (e.g., for frequency division duplex (FDD)) and the associated CSI reporting may consider a throughput-overhead trade-off.

As illustrated in the example of FIG. 2, the network entity 205 may transmit an indication, to the UE 215, of a configuration (e.g., a CSI report configuration 225) for reporting spatial domain basis function updates to the network entity 205. In some examples, based on the CSI report configuration 225, the UE 215 may transmit a full CSI report 250. The full CSI report 250 may indicate at least a set of spatial domain basis functions (e.g., the spatial domain basis functions 235). For example, the full CSI report 250 may indicate the spatial domain basis functions 235 and the channel coefficients 240. Additionally, or alternatively, the full CSI report 250 may indicate the frequency domain basis functions 245. In some examples, the UE 215 may transmit a partial CSI report 255. The partial CSI report 255 may indicate an update for the spatial domain basis functions 235. In some examples, the partial CSI report 255 may indicate an update for the spatial domain basis functions 235 relative to the full CSI report 250 (e.g., relative to the spatial domain basis functions 235 indicated using the full CSI report 250). Additionally, or alternatively, the partial CSI report 255 may indicate an update for the set of spatial domain basis functions 235 relative to a previously transmitted partial CSI report (e.g., relative to a previously transmitted update for the spatial domain basis functions 235 indicated using the full CSI report 250). In some examples, the UE 215 may receive a message 260 from the network entity 205 based on the partial CSI report. Configuring the UE 215 to update the set of spatial domain basis functions may improve the reliability of communication between the UE 215 and the network entity 205, among other possible benefits.

Figure 3:
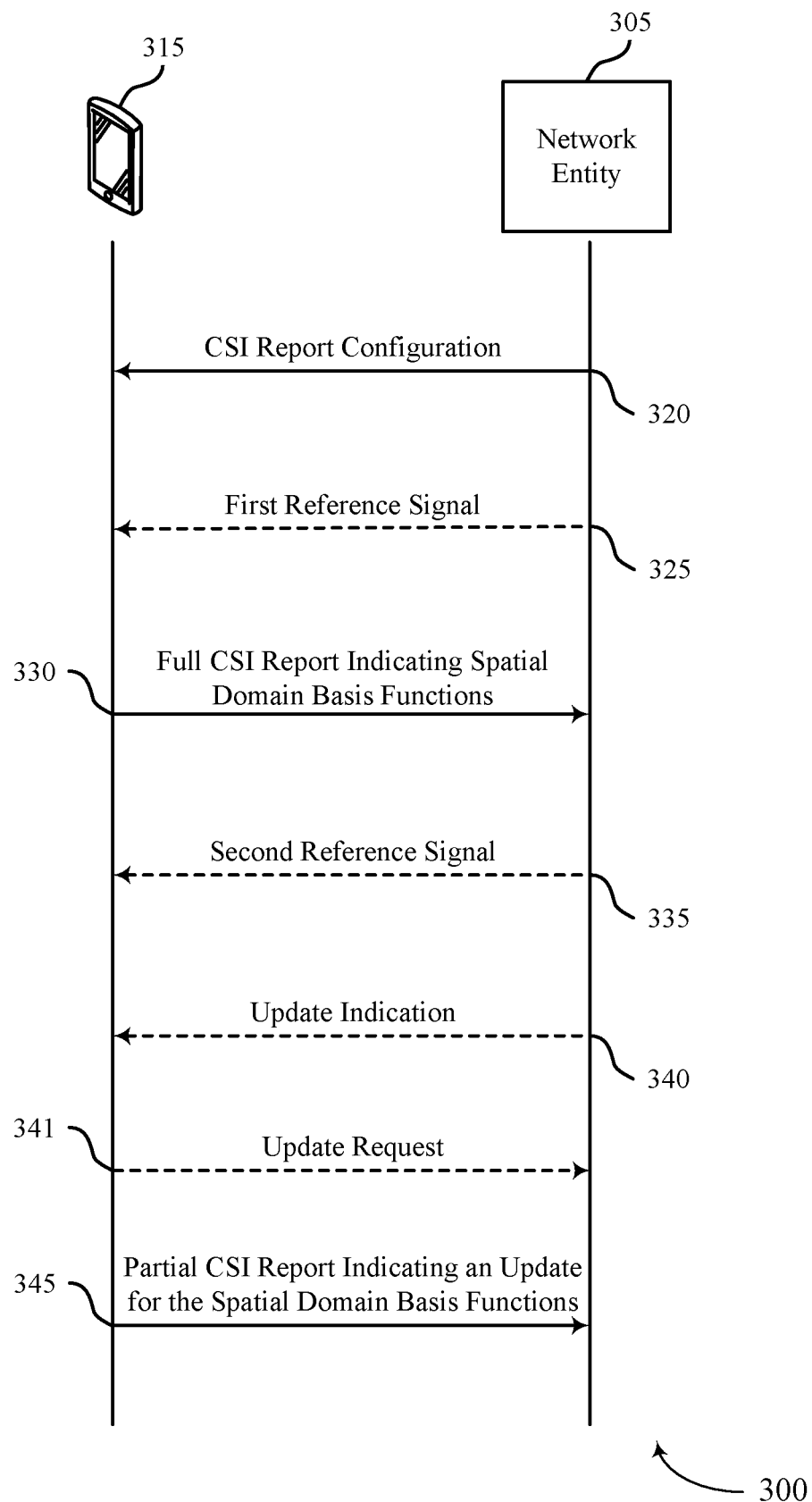
FIGS. 3 and 4 each illustrate an example of a process flow that supports techniques for spatial domain basis function refinement in accordance with various aspects of the present disclosure.

FIG. 3 illustrates an example of a process flow 300 that supports techniques for spatial domain basis function refinement in accordance with various aspects of the present disclosure. The process flow 300 may implement or be implemented at or using one or more aspects of the wireless communications system 100 and the wireless communications system 200. For example, the process flow 300 may be implemented at a network entity 305 and a UE 315, which may be examples of the corresponding devices described with reference to FIGS. 1 and 2. In some examples, the network entity 305 and the UE 315 may implement the process flow 300 to promote network efficiencies by supporting a framework for updating spatial domain basis functions. The process flow 300 may also be implemented by the network entity 305 and the UE 315 to promote high reliability and low latency operations, among other benefits. In the following description of the process flow 300, the operations between the UE 315 and the network entity 305 may occur in a different order than the example order shown. Additionally, or alternatively, the operations performed by the UE 315 and the network entity 305 may be performed in different orders or at different times. Some operations may also be omitted.

As illustrated in the example of FIG. 3, the network entity 305 may configure the UE 315 to report an update for a set of spatial domain basis functions (e.g., based on channel conditions experienced at the UE 315). For example, at 320, the UE 315 may receive a message indicating a CSI report configuration. The CSI report configuration may be an example of a CSI report configuration as described throughout the present disclosure, including with reference to FIG. 2. For example, the CSI report configuration may be for reporting spatial domain basis function updates to the network entity 305. In some examples, the CSI report configuration may be a codebook configuration with a spatial domain basis function update feature. That is, the CSI report configuration may include an indication to enable partial CSI reporting at the UE 315. In some examples, the network entity 305 may indicate the CSI report configuration to the UE 315 using a higher layer parameter (e.g., as via RRC signaling), such as via higher layer parameters that may be used to indicate a codebook configuration, a measurement configuration (e.g., one or more resources to be used at the UE 315 for performing CSI measurements), or a reporting configuration (e.g., one or more time instances in which the UE 315 may perform CSI reporting), or any combination thereof.

At 330, the UE 315 may transmit, to the network entity 305, a full CSI report indicating at least a set of spatial domain basis functions. The full CSI report may be an example of a full CSI report described throughout the present disclosure, including with reference to FIG. 2. For example, the full CSI report may be based on the CSI report configuration (e.g., indicated to the UE 315 at 320) and include the set of spatial domain basis functions (e.g., and a set of channel coefficients associated with the spatial domain basis functions). That is, the full CSI repot may include spatial domain basis function feedback (e.g., initial feedback for the matrix $W_1$ as described with reference to FIG. 2), for example as part of a CSI report (e.g., a Type-II codebook CSI report).

In some examples, the full CSI report transmitted at 330 may be based on measurements performed at the UE 315. For example, at 325, the UE 315 may receive a first reference signal from the network entity 305. The first reference signal may be an example of a CSI-RS or one or more other types of downlink reference signals. The UE 315 may perform one or more measurements using the first reference signal and may use the one or more measurements to determine (e.g., select, identify) the set of spatial domain basis functions (e.g., and the set of channel coefficients) indicated using the full CSI report transmitted at 330.

At 345, the UE 315 may transmit a partial CSI report indicating an update for the set of spatial domain basis functions to the network entity 305. The partial CSI report may be an example of a partial CSI report described throughout the present disclosure, including with reference to FIG. 2. For example, the partial CSI report may be based on the CSI report configuration and include an update for the set of spatial domain basis functions relative to the full CSI report transmitted at 330 or relative to a previously transmitted partial CSI report (e.g., one or more updates for a respective angle (θ) associated with one or more spatial domain basis functions, such as may be indicated using a change in the angle (e.g., represented using a parameter $\Delta\theta$) with a basis element {i}). For example, the UE 315 and the network entity 305 may support an extension of the spatial domain basis functions, such that the spatial domain basis functions may be time-varying (e.g., may support time-varying spatial domain basis functions). In some examples, the spatial domain basis functions may occur in two dimensions (2D) (e.g., in contrast to the frequency domain basis functions and time domain or Doppler domain basis functions, which may occur in one dimension (1D)). In such examples, the UE 215 may report time-varying spatial domain basis functions in three dimensions (3D) (e.g., an azimuthal dimension, a zenith dimension, and a time dimension), which may lead to increased overhead. In some examples, however, the spatial domain basis functions (e.g., for Type II codebooks) may be based on a discrete Fourier transform. As such, the UE 315 may indicate an update for a spatial domain basis function using a change in an angle (e.g., indicated using a value of the parameter $\Delta\theta$) associated with the spatial domain basis function. For example, a spatial domain basis function (e.g., a discrete Fourier transform basis function) may be described in accordance with the following Equation 10:

$$e^{j\frac{2\pi k}{N}} \quad (10)$$

in which j may represent an imaginary number (e.g., $\sqrt{-1}$), k may represent a frequency, and N may represent an integer (e.g., a quantity of points, a sampling number). As such, at a first time instance (e.g., at time t=0), a set of spatial domain basis functions may be represented as $$\left[0, e^{j\frac{2\pi k}{N}}, e^{j\frac{4\pi k}{N}}, e^{j\frac{6\pi k}{N}}, \dots\right].$$

Additionally, or alternatively, at a second time instance (e.g., at time t) the set of spatial domain basis functions may be represented as $$\left[0, e^{j\frac{2\pi(k+\Delta\theta)}{N}}, e^{j\frac{4\pi(k+\Delta\theta)}{N}}, e^{j\frac{6\pi(k+\Delta\theta)}{N}}, \dots\right].$$

In some examples, the value of the parameter $\Delta\theta$ (e.g., for each spatial domain basis functions) may be indicated (e.g., from the UE 315) using multiple values (e.g., a pair of values), such as a value for the azimuthal dimension (e.g., an azimuthal angle) and a value for the zenith dimension (e.g., a zenith angle).

In some examples, the UE 315 may indicate multiple values of the parameter $\Delta\theta$ for the set of spatial domain basis functions (e.g., a different value of the parameter $\Delta\theta$ for each column of the matrix $W_1$). For example, the UE 315 may indicate one or more $\Delta\theta$ values to be applied (e.g., at the network entity 305) over a duration with respect to the full CSI report (e.g., each column of the matrix $W_1$ indicated using the full CSI report) or another partial CSI report (e.g., each value of the parameter $\Delta\theta$ previously indicated using another partial CSI report). That is, columns of the matrix $W_1$ may correspond to discrete Fourier transform basis functions (e.g., over-sampled discrete Fourier transform basis functions) and, as such, the UE 315 may indicate the parameter $\Delta\theta$ (e.g., may report $\Delta\theta$ indications) using offset values, such that the network entity 305 may determine an update for the set of spatial domain basis functions based on the offset values. For example, the UE 315 may use the offset values to indicate, to the network entity 305, an updated spatial domain basis function (e.g., an updated beam index $(b_i)$) that may have a value selected from (e.g., determined from, included in) a set of indices represented as $\{0, 1, \dots, O_1 N_1-1\}$ and $\{0, 1, \dots, O_2 N_2-1\}$, in which $N_1$ and $N_2$ may correspond to antenna elements at the network entity 305 (e.g., antenna configuration values) and $O_1$ and $O_2$ may correspond to over-sampling factors. In such examples, the set of indices, antenna configuration values, and over-sampling factors may be included in the CSI configuration indicated to the UE 315 at 320. For example, at a time $t_0$ (e.g., using the full CSI report transmitted at 330), the UE 315 may indicate the spatial domain basis function (e.g., a beam index $(b_i)$) to the network entity 305. In such an example, based on the full CSI report transmitted at 330, the network entity 305 may determine the spatial domain basis function in accordance with the following Equations 11 and 12:

$$m_1^{(i)} \in \{0, 1, \dots, O_1 N_1-1\} \quad (11)$$

$$m_2^{(i)} \in \{0, 1, \dots, O_2 N_2-1\} \quad (12)$$

in which $m_1^{(i)}$ may correspond to a first dimension of the spatial domain basis function, $m_2^{(i)}$ may correspond to a second dimension of the spatial domain basis function, and i may represent an index for the spatial domain basis function (e.g., the spatial domain basis vector, such that i=0, 1, . . . , L−1). Additionally, or alternatively, at time $t_1$ (e.g., using a quantity of bits included in the partial CSI report transmitted at 345), the UE 315 may indicate an update for the spatial domain basis function using an offset. For example, the UE 315 may indicate an offset (e.g., a value of a parameter $d_1^{(i)}$) for $m_1^{(i)}$ and an offset (e.g., a value of a parameter $d_2^{(i)}$) for $m_2^{(i)}$. In such an example, the network entity 305 may determine the updated spatial domain basis function (e.g., a beam formed using the updated spatial domain basis function) in accordance with the following Equations 13 and 14:

$$m_1^{(i)}+d_1^{(i)}\in\{0,1,\ldots,O_1N_1-1\} \quad (13)$$

$$m_2^{(i)}+d_2^{(i)}\in\{0,1,\ldots,O_2N_2-1\} \quad (14)$$

In some examples, using the offset values (e.g., the parameters $d_1^{(i)}$ and $d_2^{(i)}$) to indicate the update for the spatial domain basis function (e.g., for each beam ($b_i$)) may lead to reduced overhead (e.g., may include the use of relatively fewer bits) compared to transmitting a full CSI report (e.g., compared to reporting values for $i_{1,1}$ and $i_{1,2}$, which may be used for deriving $m_1^{(i)}$ and $m_2^{(i)}$ for each beam (i)).

In some examples, the offset values may be based on measurements performed at the UE 315. For example, at 335, the UE 315 may receive a second reference signal from the network entity 305. The second reference signal may be an example of a CSI-RS or one or more other types of downlink reference signals. The UE 315 may perform one or more measurements using the second reference signal and may use the one or more measurements to determine (e.g., select, identify) the offset values indicated using the partial CSI report transmitted at 345.

In some examples, the UE 315 may transmit the partial CSI report at 345 based on an update indication received from the network entity 305. For example, at 340, the UE 315 may receive and updated indication from the network entity 305. In some examples, the update indication received at the UE 315 at 340 may include a request for the UE 315 to transmit the partial CSI report at 345. Additionally, or alternatively, the update indication received at the UE 315 at 340 may indicate a time instance (or multiple time instances, such as during a duration) during which the UE 315 may transmit the partial CSI report. Additionally, or alternatively, the update indication received at the UE 315 at 340 may indicate for the UE 315 to transmit the partial CSI report periodically, such as using a periodic report. That is, in some examples, the network entity 305 may transmit the update indication at 340 to activate (or deactivate) partial CSI reporting at the UE 315. In some examples, the UE 315 may request to transmit the partial CSI report at 345. For example, at 341, the UE 315 may transmit an update request, to the network entity 305, to transmit a partial CSI report at 345 (e.g., to update the spatial domain basis functions).

Figure 4:
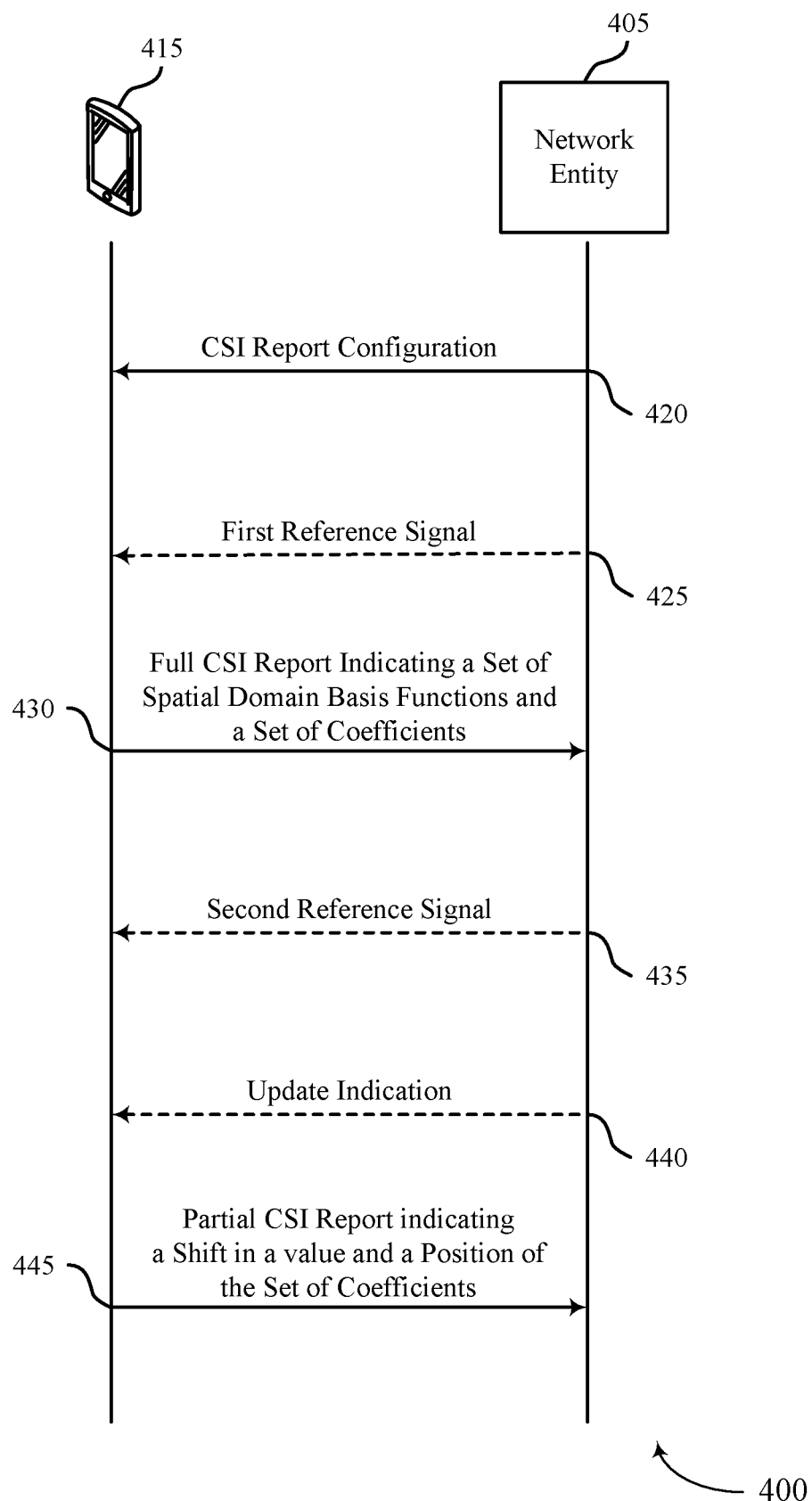

FIG. 4 illustrates an example of a process flow 400 that supports techniques for spatial domain basis function refinement in accordance with various aspects of the present disclosure. The process flow 400 may implement or be implemented at or using one or more aspects of the wireless communications system 100, the wireless communications system 200, and the process flow 300. For example, the process flow 400 may be implemented at a network entity 405 and a UE 415, which may be examples of the corresponding devices described with reference to FIGS. 1 through 3. In some examples, the network entity 405 and the UE 415 may implement the process flow 400 to promote network efficiencies by supporting a framework for updating spatial domain basis functions. The process flow 400 may also be implemented by the network entity 405 and the UE 415 to promote high reliability and low latency operations, among other benefits. In the following description of the process flow 400, the operations between the UE 415 and the network entity 405 may occur in a different order than the example order shown, or the operations performed by the UE 415 and the network entity 405 may be performed in different orders or at different times. Some operations may also be omitted.

As illustrated in the example of FIG. 4, the network entity 405 may configure the UE 415 to report an update for a set of spatial domain basis functions (e.g., based on channel conditions experienced at the UE 415). For example, at 420, the UE 415 may receive a message indicating a CSI report configuration. The CSI report configuration may be an example of a CSI report configuration as described throughout the present disclosure, including with reference to FIGS. 2 and 3. For example, the CSI report configuration may be for reporting spatial domain basis function updates to the network entity 405. In some examples, the CSI report configuration may be a codebook configuration with a spatial domain basis function update feature.

At 430, the UE 415 may transmit a full CSI report indicating a set of spatial domain basis functions and a set of channel coefficients to the network entity 405. The full CSI report may be an example of a full CSI report described throughout the present disclosure, including with reference to FIGS. 2 and 3. For example, the full CSI report may be based on the CSI report configuration indicated to the UE 415 at 420. Additionally, or alternatively, the full CSI report transmitted at the UE 415 at 430 may be an example of a Type-II codebook CSI report.

In some examples, the full CSI report transmitted at the UE 415 at 430 may be based on measurements performed at the UE 415. For example, at 425, the UE 415 may receive a first reference signal from the network entity 405. The first reference signal may be an example of a CSI-RS or one or more other types of reference signals (e.g., downlink reference signals). The UE 415 may perform one or more measurements using the first reference signal and may use the one or more measurements to determine (e.g., select, identify) the set of spatial domain basis functions (e.g., and the set of channel coefficients).

At 445, the UE 415 may transmit a partial CSI report indicating a shift in a value and a position of the set of coefficients (e.g., channel coefficients) to the network entity 405. For example (e.g., for relatively higher radio frequency spectrum band operation), the network entity 405 may generate one or more beams (e.g., may perform beamforming operations using an analog block to generate a pattern for antenna elements to be used to transmit data to the UE 415) according to one or more implementations. That is, the network entity 405 may include multiple antenna panels (e.g., multiple sub-arrays, multiple antenna components) and may use an antenna panel (e.g., of the multiple antenna panels) to generate a beam in a direction. In such an example, while the network entity 405 may use the beam (e.g., generated using one or more antenna ports, such as two antenna ports) over a duration (e.g., as an extension for type-II codebook operation), the network entity 405 may activate multiple beams (e.g., using multiple other antenna ports). As such, at a time instance (e.g., for some CSI feedback), a structure of the matrix $W_{2,l}$ may depend on the quantity of beams activated at the network entity 405. For example, the quantity of rows included in the matrix $W_{2,l}$ may correspond to the quantity of beams (e.g., columns of the $W_1$ matrix) activated at the network entity 405. In such examples, the matrix $W_{2,l}$ (e.g., the set of channel coefficients) may include $K_0$ non-zero coefficients per layer (l) (e.g., $2K_0$ non-zero coefficients across multiple layers).

In some examples, the $K_0$ non-zero coefficients (e.g., included in the set of channel coefficients associated with the spatial domain basis functions) may occur (e.g., within the matrix $W_{2,l}$) along an i-th row and an (i+L)-th row in the $W_{2,l}$ matrix, in which the i-th beam ($b_i$) may be used at the network entity 405 (e.g., for communications with the UE 415). In some examples, the i-th beam ($b_i$) may correspond to a CSI resource index (CRI) value (e.g., CRI-i). In such examples, the parameter $K_0$ (may have a value equal to at least 2M (e.g., the matrix $W_{2,l}$ may include at least 2M non-zero coefficients) and the (2L−2) rows may have a value of zero. Additionally, or alternatively, in some examples, the i-th beam ($b_i$) may correspond to a combination of multiple beams. That is, multiple beams may be used (e.g., available for use) at the network entity 405. For example, the i-th and j-th rows (e.g., and corresponding cross-polarizations ((i+L) and (j+L)-th) antenna ports) may be used at the network entity 405. That is, the network entity 405 may use a range of beams from beam k to beam l. For example, the network entity 405 may use beams k, k+1, k+2, . . . l. In such an example, the network entity 405 may indicate the rows and columns used at the network entity 405 to the UE 415.

In some examples, the network entity 405 may determine that the UE 415 may move in a direction. As such, the network entity 405 may determine to adapt one or more beams (e.g., used at the network entity 405 for communications with the UE 415) according to the direction in which the UE 415 may move. That is the network entity 405 may increase or decrease a beam index ($b_i$) based on the direction in which the UE 415 may move. In some examples, to adapt the set of spatial domain basis functions, the UE 415 may indicate (e.g., signal to the network entity 405) a channel coefficient matrix (e.g., the $W_{2,l}$ matrix) in which the non-zero coefficients (e.g., the non-zero entries) may be shifted (e.g., row-wise) relative to a location of the non-zero coefficients of a previously reported set of channel coefficients (e.g., of a previously reported $W_{2,l}$ matrix).

In some examples, the network entity 405 may group beams (e.g., bundle beams). For example, a column of the $W_1$ matrix may correspond to an active beam at the network entity 405 and multiple active beams may be grouped, such that a shift in the rows of the $W_{2,l}$ matrix (e.g., a row-wise shift of the non-zero coefficients) may lead to a shift in the spatial domain basis functions used at the network entity 405 (e.g., a shift of the grouped beams). In such examples, the network entity 405 may have controllability to indicate, to the UE 415, a type of row-shift to be performed at the network entity 405 (e.g., to adapt the grouped beams, to adapt the spatial domain basis functions). For example, based on the indicated type of row-shift, the UE 415 may indicate a row-wise shift of the position of the non-zero coefficients (e.g., as an integer, such as ±{1, 2 . . . }) to the network entity 405, such as using a quantity of bits included in the partial CSI report transmitted at the UE 415 at 445. That is, the UE 415 may indicate the row-wise shift using feedback associated with the channel coefficients (e.g., with $\Delta W_{2,l}$ feedback).

In some examples, as part of partial CSI reporting (e.g., as part of transmitting the partial CSI report at 445 to update the spatial domain basis functions) one or more bits (e.g., additional bits transmitted using a bitfield ($c_i$)) may be used to indicated (e.g., signal) the position of the non-zero coefficients (e.g., within the $W_{2,l}$ matrix). For example, the UE 415 may include bits "00" (or may refrain from including one or more bits) in the partial CSI report transmitted at 445 to indicate, to the network entity 405, to maintain a same position of the non-zero coefficients (e.g., within the $W_{2,l}$ matrix indicated to the network entity 405 using the full CSI report transmitted at the UE 415 at 430). That is the UE 415 may include bits "00" to indicate, to the network entity 405, to use a same set of spatial domain basis functions (e.g., to refrain from updating the spatial domain basis functions). For example, the UE 415 may include bits "00" (or may refrain from including one or more bits) in the partial CSI report to indicate, to the network entity 405, to use a same set of beams as may have been indicate using previously reported CSI (e.g., using the full CSI report transmitted at the UE 415 at 430 or a previously transmitted partial CSI report).

In some examples, a shift of one row in the position of the non-zero coefficients (e.g., within the matrix $W_{2,l}$) may be mapped to codepoint of the bit field ($c_i$). For example, bits "01" may indicate a shift of 1 row (e.g., in the position of the non-zero coefficients within the matrix $W_{2,l}$) and, accordingly, may indicate a shift of the spatial domain basis functions by 1 index. That is, the bits "01" may indicate an increase in the index associated with the spatial domain basis functions by a value of 1. For example, a codepoint value of "01" may indicate, to the network entity 405, to use a neighboring beam that may be succeeding (e.g., in index) by a value of 1. Additionally, or alternatively, bits "10" may indicate a shift of −1 row (e.g., in the position of the non-zero coefficients within the matrix $W_{2,l}$) and, accordingly, may indicate a shift of the spatial domain basis functions by −1 index. That is, the bits "10" may indicate a decrease in the index associated with the spatial domain basis functions by a value of 1. For example, a codepoint value of "10" may indicate, to the network entity 405, to use a neighboring beam that may be preceding (e.g., in index) by a value of 1. In some examples, bits "11" may indicate a reset of the partial CSI report, for example using some reference CSI (e.g., a full CSI report). That is a codepoint value of "11" may indicate, to the network entity 405, a request for the UE 415 to transmit an indication of a set of spatial domain basis functions to the network entity 405 (e.g., using a full CSI report). It is to be understood that the bits described herein may change based on implementation of one or more devices (e.g., the UE 415, the network entity 405, or both), and the examples described herein should not be considered limiting to the scope covered by the claims or the disclosure.

In some examples, the UE 415 may indicate the partial CSI report (e.g., an update to the spatial domain basis functions) at 445 with reference to a previous partial CSI report (e.g., a previous row-shifted set of channel coefficients). For example, the partial CSI report transmitted at 445 (e.g., including the update to set of channel coefficients) may be determined as a function of some reference channel coefficient values (e.g., included in a matrix $W_2^{(ref)}$) and updated channel coefficient values (e.g., included in a matrix $W_2^{(n)}$). In such an example, the reference channel coefficient value ($W_2^{(ref)}$) may include shifted index locations (e.g., the bit field ($c_i$)), for example to indicate the change in the spatial domain basis functions. For example, the update to set of channel coefficients (e.g., represented as the matrix $\Delta W_2^{(n)}$) may be determined in accordance with the following Equation 15:

$$W_2^{(n)} = W_2^{(n)} - W_2^{(ref)}[\text{shift}(c_i),:] \qquad (15)$$

in which n may correspond to an index associated with a time instance (e.g., time stamp) in which the update may be reported (e.g., from the UE 415 using the partial CSI report transmitted at 445). In such an example, the update to the set of channel coefficients (e.g., the matrix $\Delta W_2^{(n)}$) may indicate the shift in the channel coefficient value and the shift in the channel coefficient position. That is, the matrix $\Delta W_2^{(n)}$ may indicate the shift in the value of the set of channel coefficients ($W_2^{(ref)}$) and the shift in the spatial domain basis functions (e.g., via the shift in the position of the non-zero coefficient represented using $W_2^{(ref)}[\text{shift}(c_i),:]$). Additionally, or alternatively, the partial CSI report transmitted at the UE 415 at 445 may be indicated with reference to the full CSI report transmitted at 430. That is, the partial CSI report transmitted at 445 may indicate the update for the set of spatial domain basis functions relative to the full CSI report or a previous partial CSI report.

In some examples, the update to the spatial domain basis functions may be extended for reporting partial CSI based on a prediction. For example, the update to the partial spatial domain basis functions may be transmitted from the UE 415 based on a predicted time stamp. In some examples, the time stamp may be determined (e.g., at the UE 415) in accordance with the following Equation 16:

$$nR_1 + mR_2 \quad (16)$$

in which the parameter $R_1$ may correspond to a CSI measurement rate, the parameter $R_2$ may correspond to a CSI update rate (or partial CSI report rate), and m may correspond to another index associated with another time instance (e.g., another time stamp) in which the update may be reported. Additionally, or alternatively, the time stamp may be determined at the UE 415 based on measurements performed at the UE 415. For example, at 435, the UE 415 may receive (e.g., from the network entity 405, such as using a periodic CSI resource) a second reference signal (e.g., a periodic CSI resource transmitted to the UE 415 at 435). In such an example, a time instance (e.g., slot) in which the UE 415 may transmit the partial CSI report may be based on a measurement performed using the second reference signal or one or more predictions performed at the UE 415 (e.g., or both). In some examples, a rate at which the UE 415 may perform the predictions may be different from another rate at which the UE 415 may perform measurements (e.g., the CSI measurement rate indicate using the parameter $R_1$).

In some examples, movement of the UE 415 may occur such that a position of the UE 415 may occur within a zone (e.g., a geographic area) which may be served using a beam at the network entity 405. That is, movement of the UE 415 may be into a direction of a single beam at the network entity 405. In some other examples, the movement of the UE 415 may occur such that the position of the UE 415 occurs outside of the zone (e.g., a geographic area) which may be served using the beam (or one or more other beams) at the network entity 405. That is, the UE 415 may be located in between two zones served using two (e.g., different) beams at the network entity 405. Additionally, or alternatively, for relatively higher radio frequency spectrum bands, the spatial domain basis functions may be based on one or more implementations of the network entity 405. That is, the spatial domain basis functions may include discrete Fourier transform basis functions or one or more other types (e.g., non-discrete Fourier transform) basis functions. In such examples, indicating a shift in the rows of the channel coefficients may be insufficient. As such, the UE 415 (e.g., and the network entity 405) may be configured to indicate channel coefficients in adjacent rows (e.g., rows adjacent to a beam used at the network entity 405, such as a beam associated with a beam index ($b_j$)). For example, the UE 415 may indicate one or more rows, which may be represented as {i−1, i, i+1}. For example, at a first time instance, an i-th row may include non-zero coefficients. In such an example, at a subsequent time instance, the UE 415 may indicate, to the network entity 405, one or more rows adjacent to the i-th row (e.g., may indicate row i and row i−1 or row i+1), such that the network entity 405 may combine multiple beams (e.g., may combine a combination of beams corresponding to the combination of row i and row i−1 or row i and row i+1) to serve the zone in between the two beams (e.g., the zone in between row i and row i−1 or in between row i and row i+1).

Additionally, or alternatively, the network entity 405 may configure a set of candidate coefficient (e.g., candidate channel coefficients that may each be associated with an index) at the UE 415. For example, the network entity 405 may indicate one or multiple sets of channel coefficients to the UE 415 and each channel coefficient may correspond to a respective spatial domain basis function (e.g., and each set of channel coefficients may correspond to a respective set of spatial domain basis functions). In such an example, the UE 415 may indicate a selection among one or multiple sets of candidate coefficient configured at the UE 415. For example, the UE 415 may indicate an index that corresponds to a set of candidate coefficients or multiple indices that correspond to multiple candidate coefficients (e.g., included in one or multiple sets of candidate coefficients configured at the UE 415). In some examples, the UE 415 may indicate the index of the set of candidate coefficients (or the multiple indices that correspond to the multiple candidate coefficients) with the row shift indication. For example, the UE 415 may transmit, to the network entity 405, an indication of one or more sets of candidate coefficients which may indicate the update for the set of spatial domain basis functions. That is, the network entity 405 may configure and activate a candidate set of beams from which the UE 415 may report a change in the spatial domain basis functions (e.g., via indicating a set or subset of the candidate coefficients). As such, the network entity 405 may generate a beam in the direction of the UE 415, thereby improving the performance of wireless communications between the UE 415 and the network entity 405, among other possible benefits.

In some examples, the UE 415 may transmit the partial CSI report at 445 based on an update indication received from the network entity 405. For example, at 440, the UE 415 may receive and updated indication from the network entity 405. In some examples, the update indication received at the UE 415 at 440 may include a request for the UE 415 to transmit the partial CSI report at 445. Additionally, or alternatively, the update indication received at the UE 415 at 440 may indicate a time instance (or multiple time instances, such as during a duration) during which the UE 415 may transmit the partial CSI report. Additionally, or alternatively, the update indication received at the UE 415 at 440 may indicate for the UE 415 to transmit the partial CSI report periodically, such as using a periodic report. That is, in some examples, the network entity 405 may transmit the update indication at 440 to activate (or deactivate) partial CSI reporting at the UE 415. In some examples, activating (or deactivating) partial CSI reporting at the UE 415 may increase the reliability of wireless communications between the UE 415 and the network entity 405, among other possible benefits.

Figure 5:
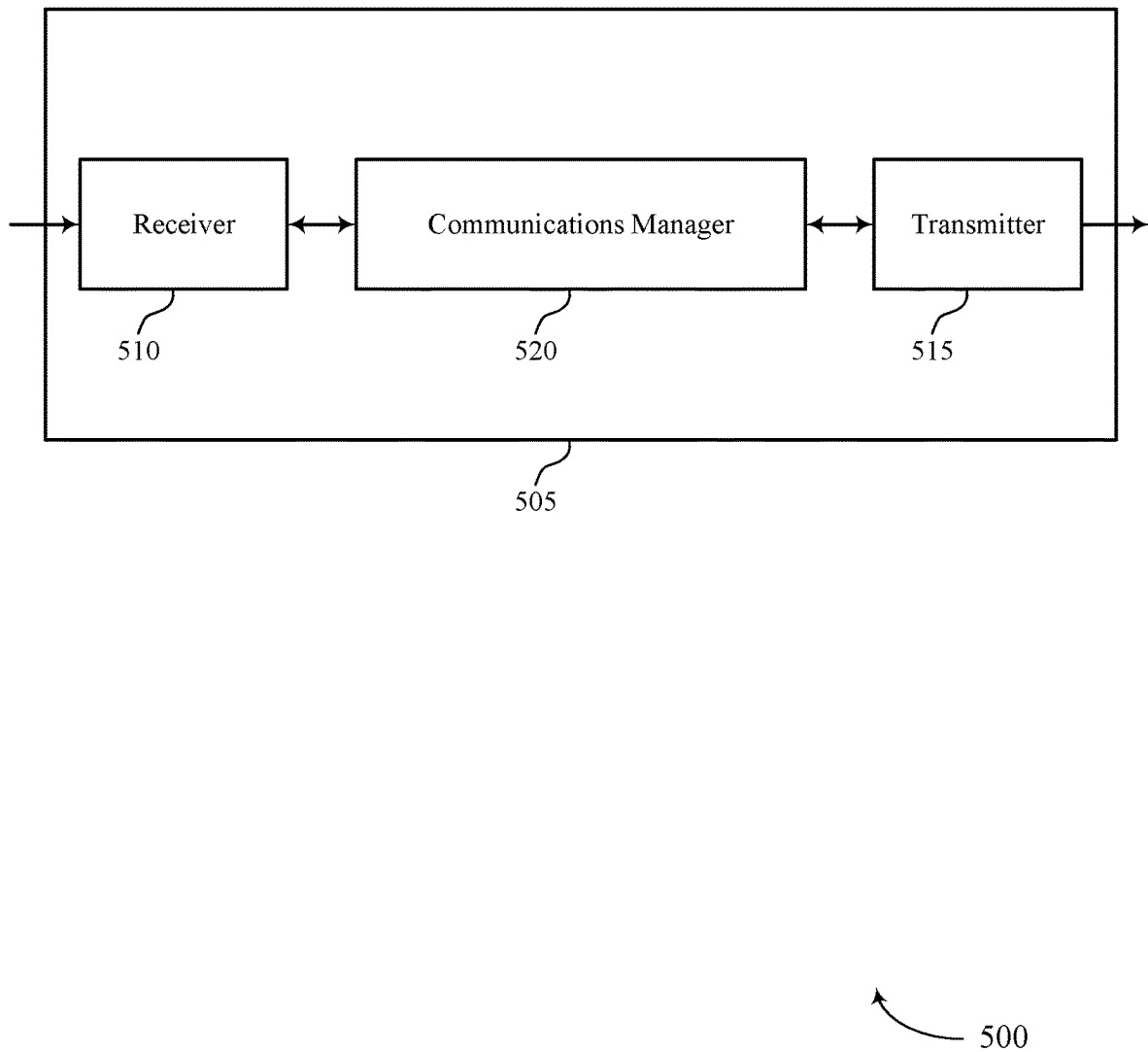
FIGS. 5 and 6 show block diagrams of devices that support techniques for spatial domain basis function refinement in accordance with various aspects of the present disclosure.

FIG. 5 shows a block diagram 500 of a device 505 that supports techniques for spatial domain basis function refinement in accordance with various aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for spatial domain basis function refinement). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for spatial domain basis function refinement). In some examples, the transmitter 515 may be co-located with a receiver 510 in a transceiver component. The transmitter 515 may utilize a single antenna or a set of multiple antennas.

The communications manager 520, the receiver 510, the transmitter 515, or various combinations thereof or various components thereof may be examples of means for performing various aspects of techniques for spatial domain basis function refinement as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE (e.g., the device 505) in accordance with examples as disclosed herein. For example, the communications manager 520 may be configured as or otherwise support a means for receiving, from a network entity, a first message indicating a configuration for reporting spatial domain basis function updates to the network entity. The communications manager 520 may be configured as or otherwise support a means for transmitting, to the network entity, a full CSI report and a partial CSI report based on the indicated configuration, the full CSI report indicating at least a set of spatial domain basis functions and the partial CSI report indicating an update for the set of spatial domain basis functions relative to the full CSI report or a previous partial CSI report. The communications manager 520 may be configured as or otherwise support a means for receiving, from the network entity, a second message based on the partial CSI report.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for more efficient utilization of communication resources.

Figure 6:
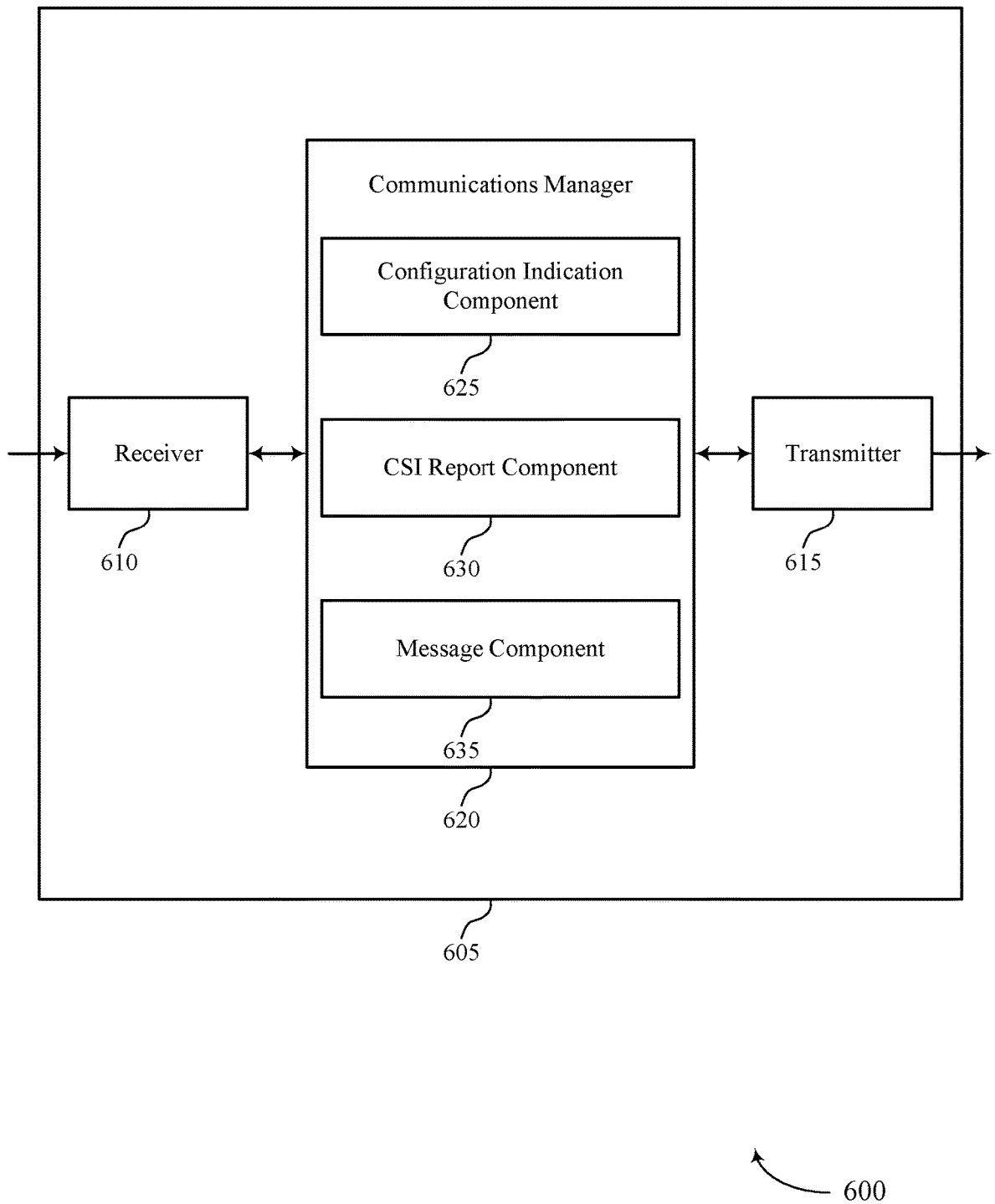

FIG. 6 shows a block diagram 600 of a device 605 that supports techniques for spatial domain basis function refinement in accordance with various aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for spatial domain basis function refinement). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for spatial domain basis function refinement). In some examples, the transmitter 615 may be co-located with a receiver 610 in a transceiver component. The transmitter 615 may utilize a single antenna or a set of multiple antennas.

The device 605, or various components thereof, may be an example of means for performing various aspects of techniques for spatial domain basis function refinement as described herein. For example, the communications manager 620 may include a configuration indication component 625, a CSI report component 630, a message component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE (e.g., the device 605) in accordance with examples as disclosed herein. The configuration indication component 625 may be configured as or otherwise support a means for receiving, from a network entity, a first message indicating a configuration for reporting spatial domain basis function updates to the network entity. The CSI report component 630 may be configured as or otherwise support a means for transmitting, to the network entity, a full CSI report and a partial CSI report based on the indicated configuration, the full CSI report indicating at least a set of spatial domain basis functions and the partial CSI report indicating an update for the set of spatial domain basis functions relative to the full CSI report or a previous partial CSI report. The message component 635 may be configured as or otherwise support a means for receiving, from the network entity, a second message based on the partial CSI report.

Figure 7:
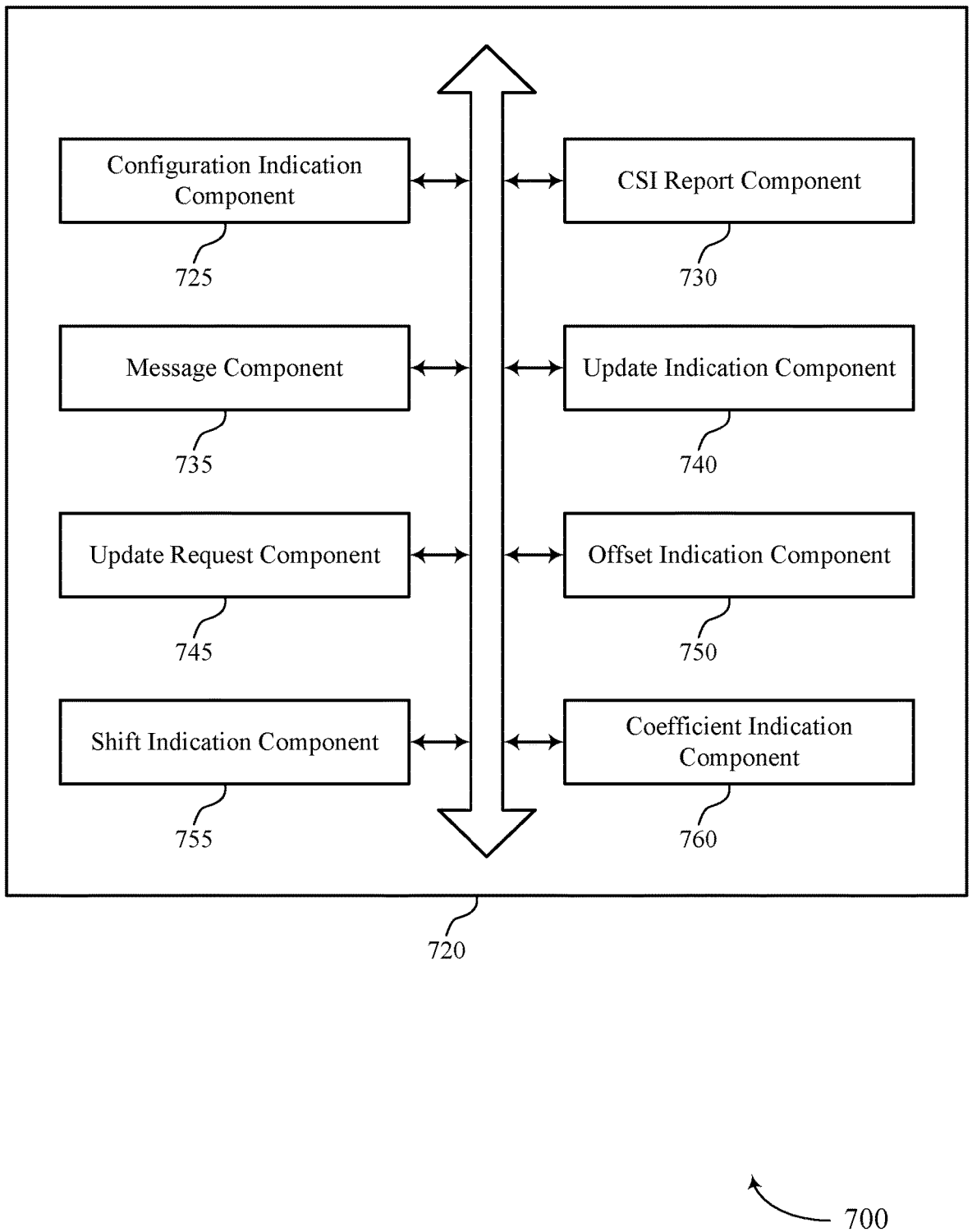
FIG. 7 shows a block diagram of a communications manager that supports techniques for spatial domain basis function refinement in accordance with various aspects of the present disclosure.

FIG. 7 shows a block diagram 700 of a communications manager 720 that supports techniques for spatial domain basis function refinement in accordance with various aspects of the present disclosure. The communications manager 720 may be an example of aspects of a communications manager 520, a communications manager 620, or both, as described herein. The communications manager 720, or various components thereof, may be an example of means for performing various aspects of techniques for spatial domain basis function refinement as described herein. For example, the communications manager 720 may include a configuration indication component 725, a CSI report component 730, a message component 735, an update indication component 740, an update request component 745, an offset indication component 750, a shift indication component 755, a coefficient indication component 760, or any combination thereof. Each of these components may communicate, directly or indirectly, with one another (e.g., via one or more buses).

The communications manager 720 may support wireless communication at a UE in accordance with examples as disclosed herein. The configuration indication component 725 may be configured as or otherwise support a means for receiving, from a network entity, a first message indicating a configuration for reporting spatial domain basis function updates to the network entity. The CSI report component 730 may be configured as or otherwise support a means for transmitting, to the network entity, a full CSI report and a partial CSI report based on the indicated configuration, the full CSI report indicating at least a set of spatial domain basis functions and the partial CSI report indicating an update for the set of spatial domain basis functions relative to the full CSI report or a previous partial CSI report. The message component 735 may be configured as or otherwise support a means for receiving, from the network entity, a second message based on the partial CSI report.

In some examples, the update indication component 740 may be configured as or otherwise support a means for receiving, from the network entity, a third message indicating for the UE to report the update for the set of spatial domain basis functions, where transmitting the partial CSI report is based on the received third message. In some examples, to support receiving the first message, the update indication component 740 may be configured as or otherwise support a means for receiving an indication to report the update for the set of spatial domain basis functions relative to the full CSI report or the previous partial CSI report, where transmitting the partial CSI report indicating the update is based on the received indication.

In some examples, the update request component 745 may be configured as or otherwise support a means for transmitting, to the network entity, a third message requesting to report the update for the set of spatial domain basis functions, where transmitting the partial CSI report is based on the transmitted third message.

In some examples, to support transmitting the partial CSI report, the offset indication component 750 may be configured as or otherwise support a means for transmitting an indication of a set of offsets to be applied to the set of spatial domain basis functions, where each offset of the set of offsets corresponds to a respective spatial domain basis function of the set of spatial domain basis functions, and where the set of offsets indicates the update for the set of spatial domain basis functions. In some examples, each offset of the set of offsets identifies a first value corresponding to an azimuthal angle associated with the respective spatial domain basis function and a second value corresponding to a zenith angle associated with the respective spatial domain basis function.

In some examples, to support transmitting the partial CSI report, the shift indication component 755 may be configured as or otherwise support a means for transmitting an indication of a shift in a position of a set of coefficients associated with the set of spatial domain basis functions, where the shift in the position of the set of coefficients indicates the update for the set of spatial domain basis functions. In some examples, the set of coefficients have a non-zero value.

In some examples, to support transmitting the indication of the shift in the position of the set of coefficients, the shift indication component 755 may be configured as or otherwise support a means for transmitting a set of bits indicating a value of an index corresponding to the shift in the position of the set of coefficients.

In some examples, to support transmitting the indication of the shift in the position of the set of coefficients, the shift indication component 755 may be configured as or otherwise support a means for transmitting an indication of a set of differential coefficients, where each differential coefficient of the set of differential coefficients correspond to a coefficient difference relative to a respective coefficient of the set of coefficients, and where the coefficient difference indicates a shift in a value and a shift in a position of the respective coefficient of the set of coefficients.

In some examples, to support transmitting the full CSI report and the partial CSI report, the CSI report component 730 may be configured as or otherwise support a means for transmitting the full CSI report at a first time instance and the partial CSI report at a second time instance subsequent to the first time instance, where the second time instance is based on a prediction performed at the UE. In some examples, the prediction is based on a CSI measurement rate configured at the UE, a CSI reporting rate configured at the UE, or both.

In some examples, to support transmitting the partial CSI report, the coefficient indication component 760 may be configured as or otherwise support a means for receiving, from the network entity, a third message indicating a set of multiple sets of coefficients, where each set of coefficients of the indicated set of multiple sets of coefficients corresponds to a respective set of spatial domain basis functions. In some examples, to support transmitting the partial CSI report, the coefficient indication component 760 may be configured as or otherwise support a means for transmitting, to the network entity based on the received third message, an indication of one or more sets of coefficients of the indicated set of multiple sets of coefficients, where the one or more sets of coefficients indicates the update for the set of spatial domain basis functions.

In some examples, to support transmitting the indication of the one or more sets of coefficients, the coefficient indication component 760 may be configured as or otherwise support a means for transmitting an indication of a set of differential coefficients, where each differential coefficient of the set of differential coefficients indicates a coefficient difference between a coefficient of a first set of coefficients of the indicated set of multiple sets of coefficients and a respective coefficient of a second set of coefficients of the indicated set of multiple sets of coefficients.

Figure 8:
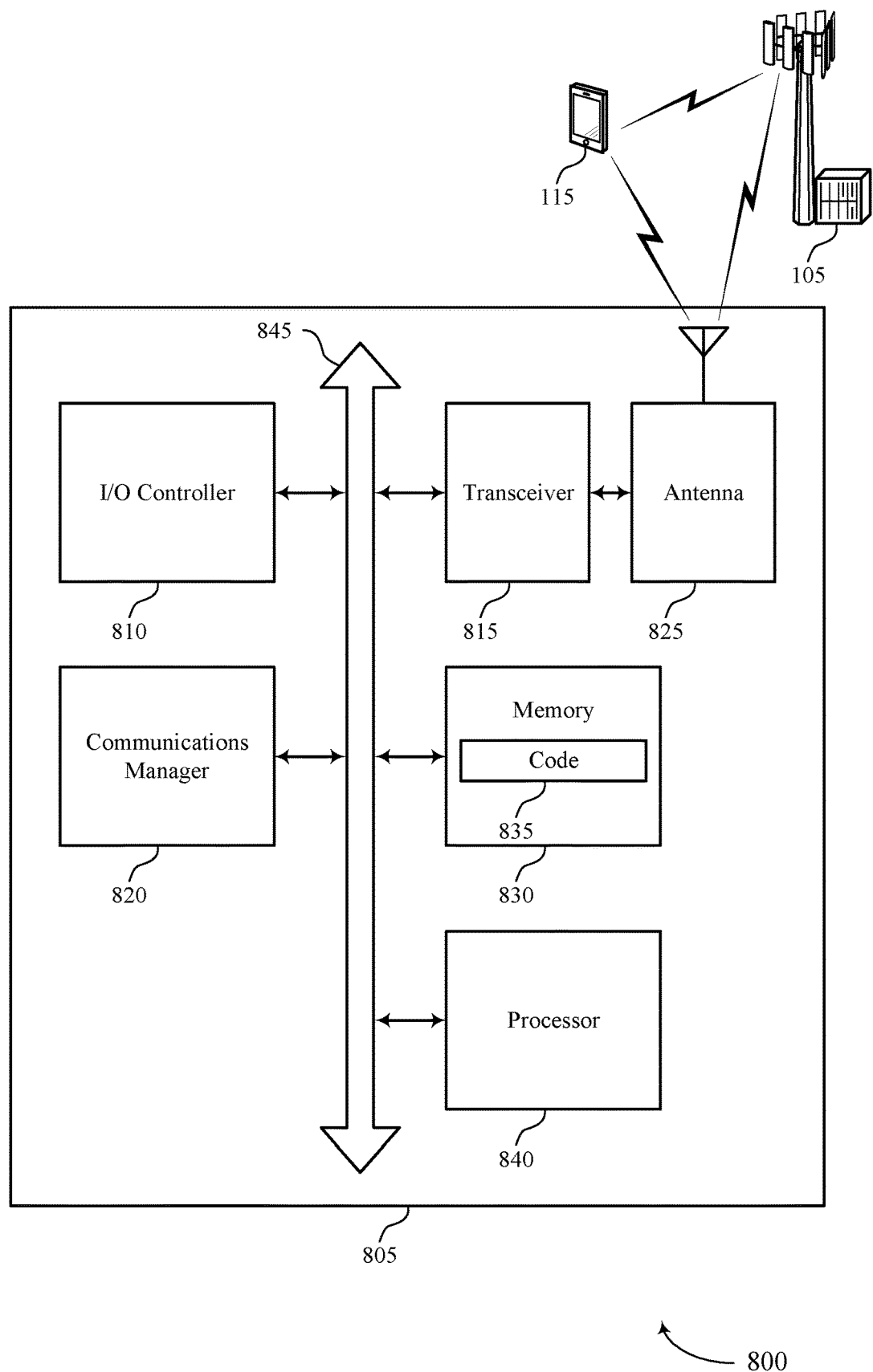
FIG. 8 shows a diagram of a system including a device that supports techniques for spatial domain basis function refinement in accordance with various aspects of the present disclosure.

FIG. 8 shows a diagram of a system 800 including a device 805 that supports techniques for spatial domain basis function refinement in accordance with various aspects of the present disclosure. The device 805 may be an example of or include the components of a device 505, a device 605, or a UE 115 as described herein. The device 805 may communicate (e.g., wirelessly) with one or more of the network entities 105, one or more of the UEs 115, or any combination thereof. The device 805 may include components for bi-directional voice and data communications including components for transmitting and receiving communications, such as a communications manager 820, an input/output (I/O) controller, such as the I/O controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include an antenna 825. However, in some other cases, the device 805 may have more than one of the antenna 825, which may be capable of concurrently transmitting or receiving multiple wireless transmissions. The transceiver 815 may communicate bi-directionally, via the one or more of the antenna 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more of the antenna 825 for transmission, and to demodulate packets received from the one or more of the antenna 825. The transceiver 815, or the transceiver 815 and one or more of the antenna 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code, such as code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for spatial domain basis function refinement). For example, the device 805 or a component of the device 805 may include a processor 840 and memory 830 coupled with or to the processor 840, the processor 840 and memory 830 configured to perform various functions described herein.

The communications manager 820 may support wireless communication at a UE (e.g., the device 805) in accordance with examples as disclosed herein. For example, the communications manager 820 may be configured as or otherwise support a means for receiving, from a network entity, a first message indicating a configuration for reporting spatial domain basis function updates to the network entity. The communications manager 820 may be configured as or otherwise support a means for transmitting, to the network entity, a full CSI report and a partial CSI report based on the indicated configuration, the full CSI report indicating at least a set of spatial domain basis functions and the partial CSI report indicating an update for the set of spatial domain basis functions relative to the full CSI report or a previous partial CSI report. The communications manager 820 may be configured as or otherwise support a means for receiving, from the network entity, a second message based on the partial CSI report.

By including or configuring the communications manager 820 in accordance with examples as described herein, the device 805 may support techniques for improved communication reliability, reduced latency, more efficient utilization of communication resources, and improved coordination between devices.

In some examples, the communications manager 820 may be configured to perform various operations (e.g., receiving, monitoring, transmitting) using or otherwise in cooperation with the transceiver 815, the one or more of the antenna 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for spatial domain basis function refinement as described herein, or the processor 840 and the memory 830 may be otherwise configured to perform or support such operations.

Figure 9:
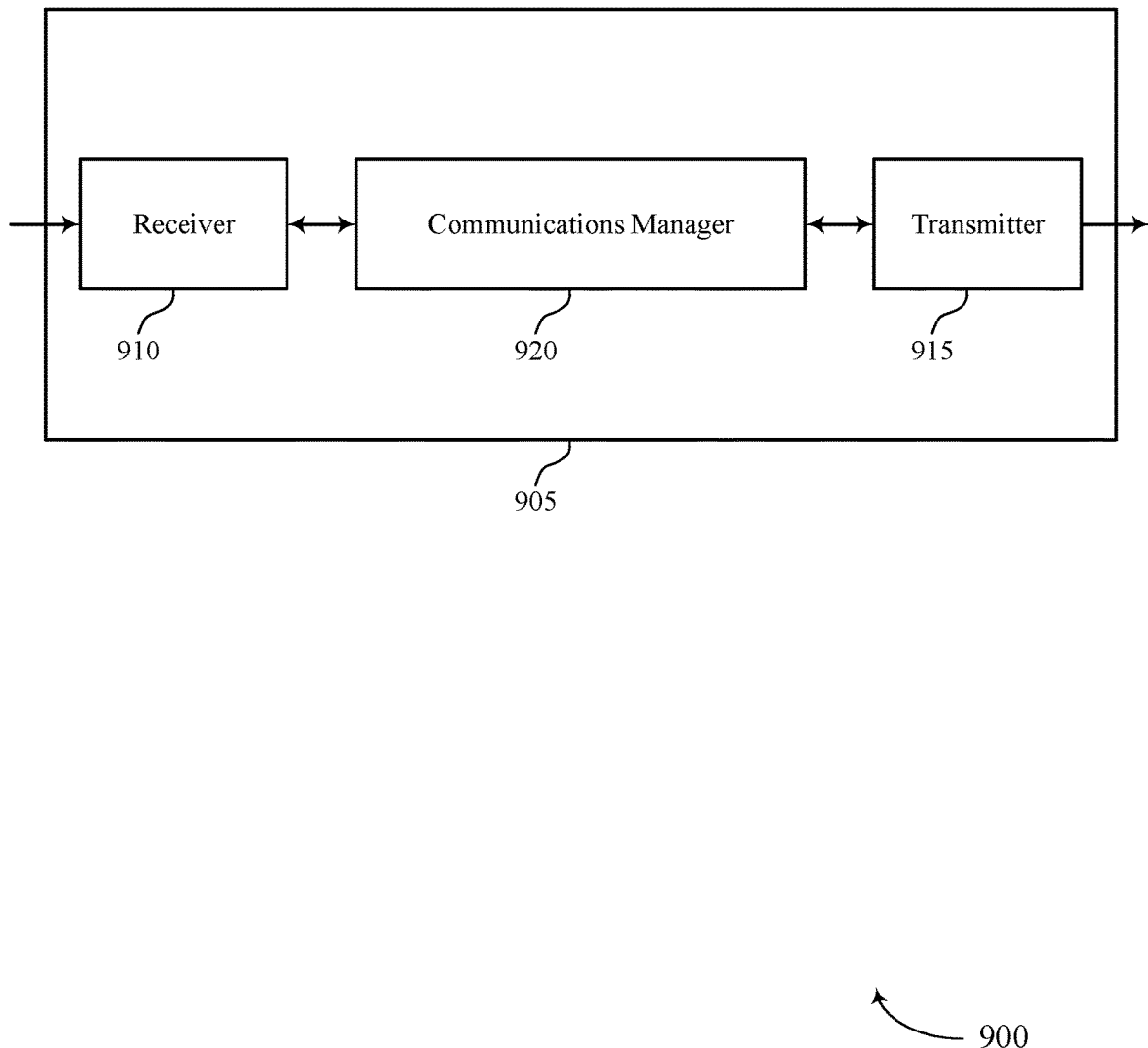
FIGS. 9 and 10 show block diagrams of devices that support techniques for spatial domain basis function refinement in accordance with various aspects of the present disclosure.

FIG. 9 shows a block diagram 900 of a device 905 that supports techniques for spatial domain basis function refinement in accordance with various aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of techniques for spatial domain basis function refinement as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity (e.g., the device 905) in accordance with examples as disclosed herein. For example, the communications manager 920 may be configured as or otherwise support a means for outputting a first message indicating a configuration for reporting spatial domain basis function updates to the network entity. The communications manager 920 may be configured as or otherwise support a means for obtaining a full CSI report and a partial CSI report based on the indicated configuration, the full CSI report indicating at least a set of spatial domain basis functions and the partial CSI report indicating an update for the set of spatial domain basis functions relative to the full CSI report or a previous partial CSI report. The communications manager 920 may be configured as or otherwise support a means for outputting a second message based on the partial CSI report.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for more efficient utilization of communication resources.

Figure 10:
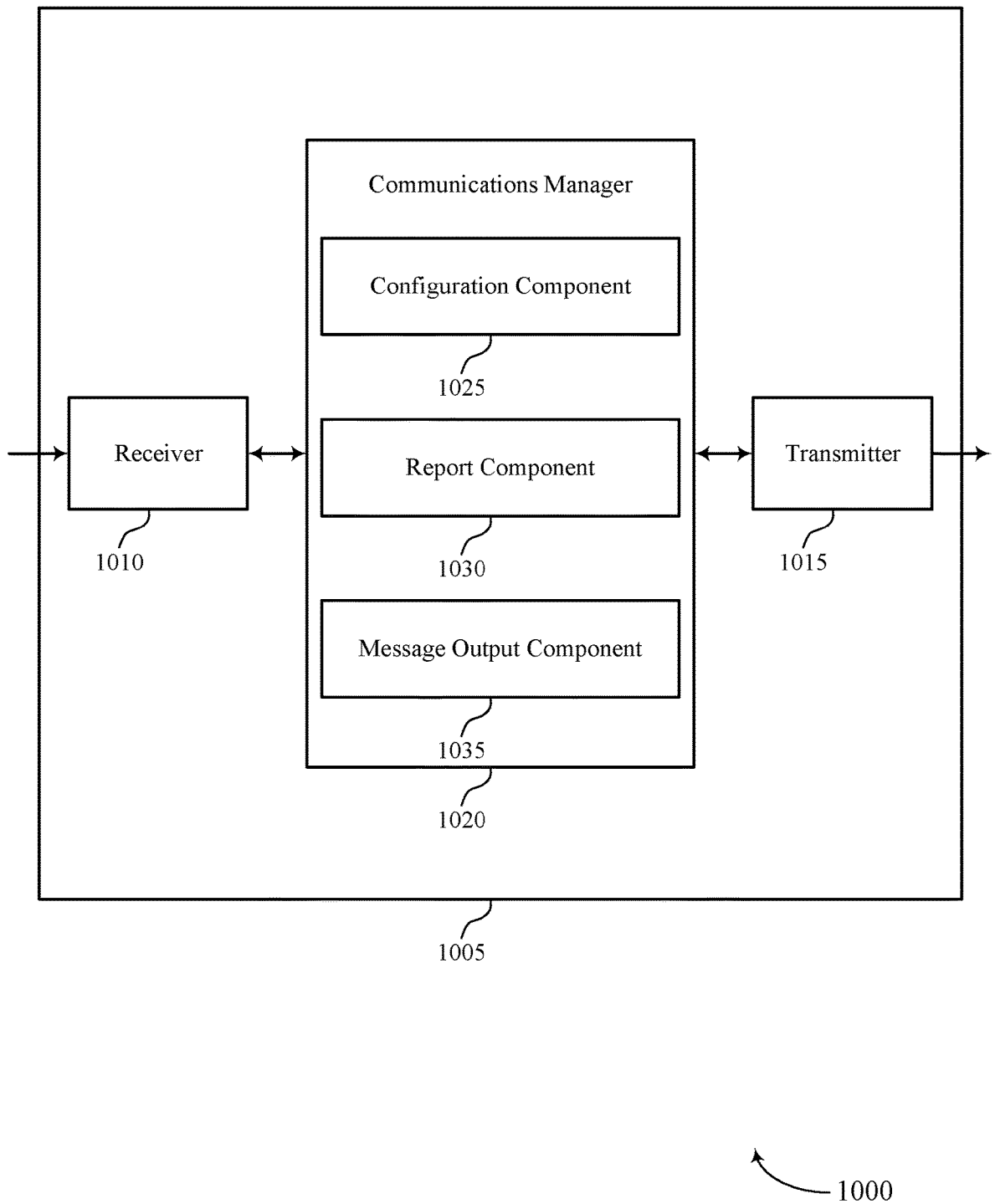

FIG. 10 shows a block diagram 1000 of a device 1005 that supports techniques for spatial domain basis function refinement in accordance with various aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of techniques for spatial domain basis function refinement as described herein. For example, the communications manager 1020 may include a configuration component 1025, a report component 1030, a message output component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity (e.g., the device 1005) in accordance with examples as disclosed herein. The configuration component 1025 may be configured as or otherwise support a means for outputting a first message indicating a configuration for reporting spatial domain basis function updates to the network entity. The report component 1030 may be configured as or otherwise support a means for obtaining a full CSI report and a partial CSI report based on the indicated configuration, the full CSI report indicating at least a set of spatial domain basis functions and the partial CSI report indicating an update for the set of spatial domain basis functions relative to the full CSI report or a previous partial CSI report. The message output component 1035 may be configured as or otherwise support a means for outputting a second message based on the partial CSI report.

Figure 11:
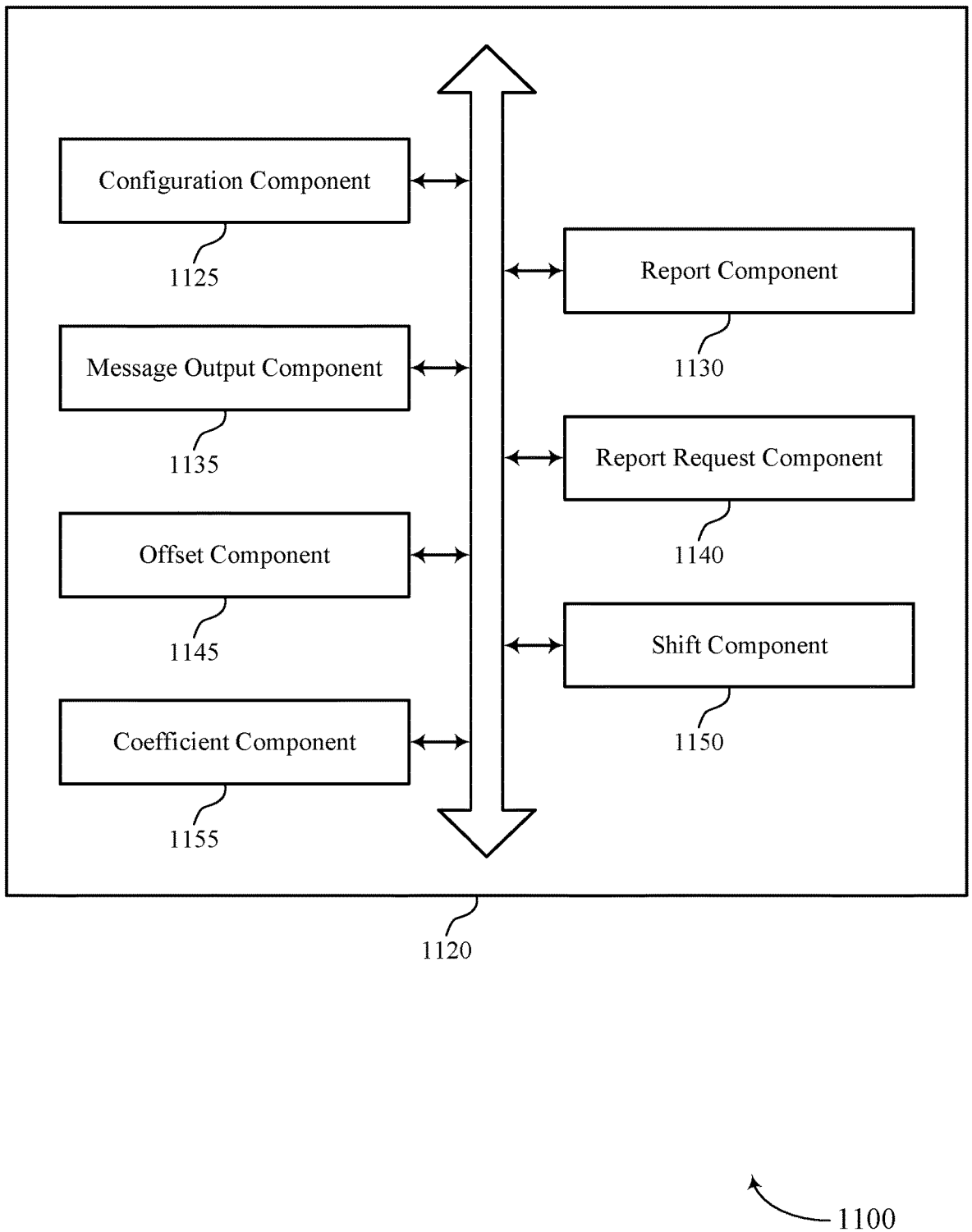
FIG. 11 shows a block diagram of a communications manager that supports techniques for spatial domain basis function refinement in accordance with various aspects of the present disclosure.

FIG. 11 shows a block diagram 1100 of a communications manager 1120 that supports techniques for spatial domain basis function refinement in accordance with various aspects of the present disclosure. The communications manager 1120 may be an example of aspects of a communications manager 920, a communications manager 1020, or both, as described herein. The communications manager 1120, or various components thereof, may be an example of means for performing various aspects of techniques for spatial domain basis function refinement as described herein. For example, the communications manager 1120 may include a configuration component 1125, a report component 1130, a message output component 1135, a report request component 1140, an offset component 1145, a shift component 1150, a coefficient component 1155, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The configuration component 1125 may be configured as or otherwise support a means for outputting a first message indicating a configuration for reporting spatial domain basis function updates to the network entity. The report component 1130 may be configured as or otherwise support a means for obtaining a full CSI report and a partial CSI report based on the indicated configuration, the full CSI report indicating at least a set of spatial domain basis functions and the partial CSI report indicating an update for the set of spatial domain basis functions relative to the full CSI report or a previous partial CSI report. The message output component 1135 may be configured as or otherwise support a means for outputting a second message based on the partial CSI report.

In some examples, the report component 1130 may be configured as or otherwise support a means for outputting a third message indicating for a UE to report the update for the set of spatial domain basis functions, where obtaining the partial CSI report is based on outputting the third message. In some examples, to support outputting the first message, the report component 1130 may be configured as or otherwise support a means for outputting an indication for a UE to report the update for the set of spatial domain basis functions relative to the full CSI report or the previous partial CSI report, where obtaining the partial CSI report indicating the update is based on outputting the indication.

In some examples, the report request component 1140 may be configured as or otherwise support a means for obtaining a third message including a request, from a UE, to report the update for the set of spatial domain basis functions, where obtaining the partial CSI report is based on outputting the third message.

In some examples, to support obtaining the partial CSI report, the offset component 1145 may be configured as or otherwise support a means for obtaining an indication of a set of offsets to be applied to the set of spatial domain basis functions, where each offset of the set of offsets corresponds to a respective spatial domain basis function of the set of spatial domain basis functions, and where the set of offsets indicates the update for the set of spatial domain basis functions. In some examples, each offset of the set of offsets identifies a first value corresponding to an azimuthal angle associated with the respective spatial domain basis function and a second value corresponding to a zenith angle associated with the respective spatial domain basis function.

In some examples, to support obtaining the partial CSI report, the shift component 1150 may be configured as or otherwise support a means for obtaining an indication of a shift in a position of a set of coefficients associated with the set of spatial domain basis functions, where the shift in the position of the set of coefficients indicates the update for the set of spatial domain basis functions. In some examples, the set of coefficients have a non-zero value.

In some examples, to support obtaining the indication of the shift in the position of the set of coefficients, the shift component 1150 may be configured as or otherwise support a means for obtaining a set of bits indicating a value of an index corresponding to the shift in the position of the set of coefficients.

In some examples, to support obtaining the indication of the shift in the position of the set of coefficients, the shift component 1150 may be configured as or otherwise support a means for obtaining an indication of a set of differential coefficients, where each differential coefficient of the set of differential coefficients correspond to a coefficient difference relative to a respective coefficient of the set of coefficients, and where the coefficient difference indicates a shift in a value and a shift in a position of the respective coefficient of the set of coefficients.

In some examples, to support obtaining the full CSI report and the partial CSI report, the report component 1130 may be configured as or otherwise support a means for obtaining the full CSI report at a first time instance and the partial CSI report at a second time instance subsequent to the first time instance, where the second time instance is based on the first time instance and a prediction performed at a UE. In some examples, the prediction is based on a CSI measurement rate configured at the UE, a CSI reporting rate configured at the UE, or both.

In some examples, to support obtaining the partial CSI report, the coefficient component 1155 may be configured as or otherwise support a means for outputting a third message indicating a set of multiple sets of coefficients, where each set of coefficients of the indicated set of multiple sets of coefficients corresponds to a respective set of spatial domain basis functions. In some examples, to support obtaining the partial CSI report, the coefficient component 1155 may be configured as or otherwise support a means for obtaining, based on outputting the third message, an indication of one or more sets of coefficients of the indicated set of multiple sets of coefficients, where the one or more sets of coefficients indicates the update for the set of spatial domain basis functions.

In some examples, to support obtaining the indication of the one or more sets of coefficients, the coefficient component 1155 may be configured as or otherwise support a means for obtaining an indication of a set of differential coefficients, where each differential coefficient of the set of differential coefficients indicates a coefficient difference between a coefficient of a first set of coefficients of the indicated set of multiple sets of coefficients and a respective coefficient of a second set of coefficients of the indicated set of multiple sets of coefficients.

Figure 12:
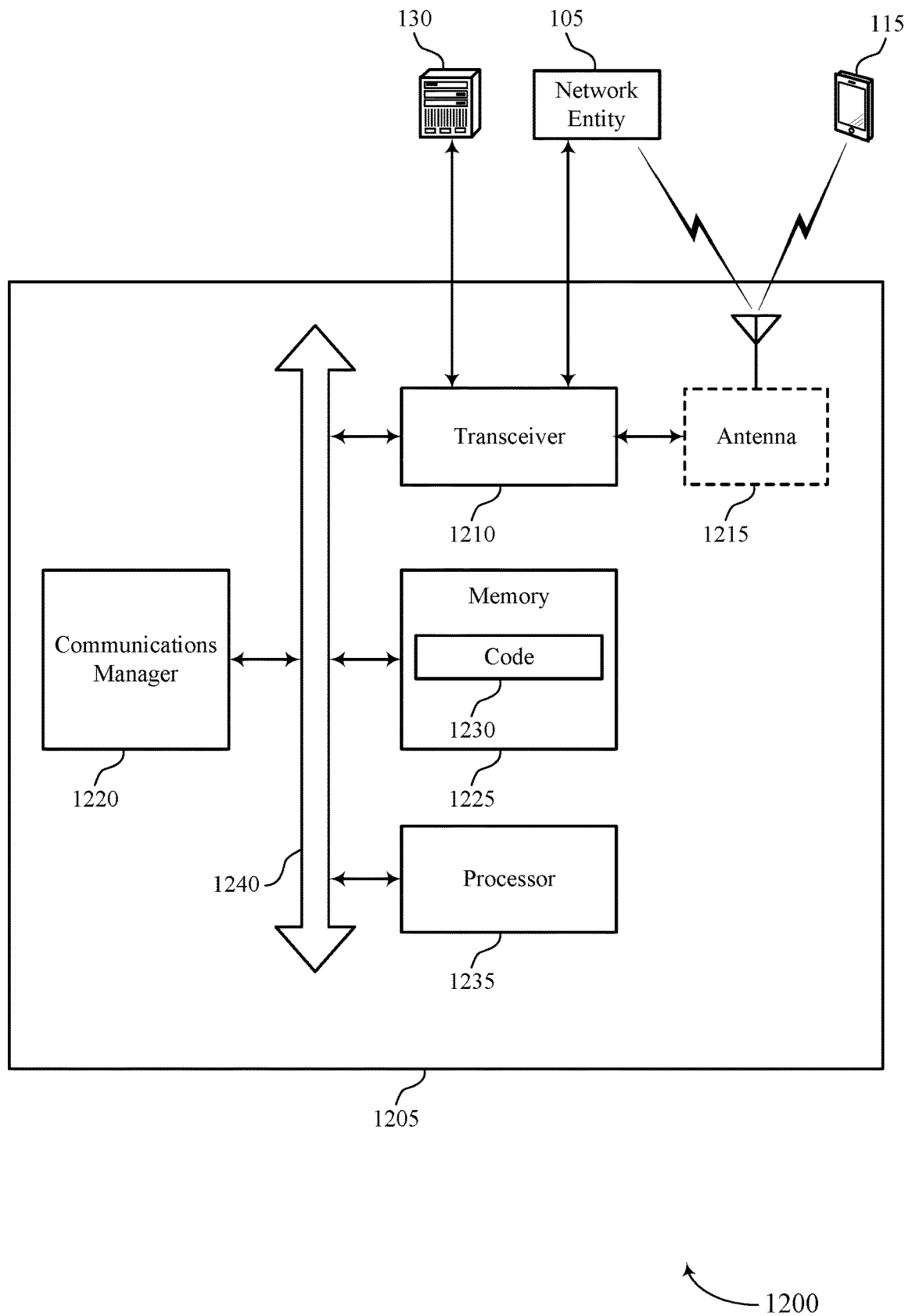
FIG. 12 shows a diagram of a system including a device that supports techniques for spatial domain basis function refinement in accordance with various aspects of the present disclosure.

FIG. 12 shows a diagram of a system 1200 including a device 1205 that supports techniques for spatial domain basis function refinement in accordance with various aspects of the present disclosure. The device 1205 may be an example of or include the components of a device 905, a device 1005, or a network entity 105 as described herein. The device 1205 may communicate with one or more of the network entities 105, one or more of the UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more of the antenna 1215, which may be capable of transmitting or receiving wireless transmissions (e.g., concurrently). The transceiver 1210 may also include a modem to modulate signals, to provide the modulated signals for transmission (e.g., by one or more of the antenna 1215, by a wired transmitter), to receive modulated signals (e.g., from one or more of the antenna 1215, from a wired receiver), and to demodulate signals. In some examples, the transceiver 1210 may include one or more interfaces, such as one or more interfaces coupled with the one or more of the antenna 1215 that are configured to support various receiving or obtaining operations, or one or more interfaces coupled with the one or more of the antenna 1215 that are configured to support various transmitting or outputting operations, or a combination thereof. In some examples, the transceiver 1210 may include or be configured for coupling with one or more processors or memory components that are operable to perform or support operations based on received or obtained information or signals, or to generate information or other signals for transmission or other outputting, or any combination thereof. In some examples, the transceiver 1210, or the transceiver 1210 and the one or more of the antenna 1215, or the transceiver 1210 and the one or more of the antenna 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code, such as the code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting techniques for spatial domain basis function refinement). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing the code 1230) to perform the functions of the device 1205. The processor 1235 may be any one or more suitable processors capable of executing scripts or instructions of one or more software programs stored in the device 1205 (such as within the memory 1225).

In some examples, the processor 1235 may be a component of a processing system. A processing system may refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations.

In some examples, the one or more interfaces may refer to an interface between the processing system of the chip or modem and a transmitter, such that the device 1205 may transmit information output from the chip or modem. Additionally, or alternatively, in some examples, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more of the UEs 115. In some examples, the communications manager 1220 may manage communications with others of the network entities 105, and may include a controller or scheduler for controlling communications with UEs 115 in cooperation with others of the network entities 105. In some examples, the communications manager 1220 may support an X2 interface within an LTE/LTE-A wireless communications network technology to provide communication between network entities 105.

The communications manager 1220 may support wireless communication at a network entity (e.g., the device 1205) in accordance with examples as disclosed herein. For example, the communications manager 1220 may be configured as or otherwise support a means for outputting a first message indicating a configuration for reporting spatial domain basis function updates to the network entity. The communications manager 1220 may be configured as or otherwise support a means for obtaining a full CSI report and a partial CSI report based on the indicated configuration, the full CSI report indicating at least a set of spatial domain basis functions and the partial CSI report indicating an update for the set of spatial domain basis functions relative to the full CSI report or a previous partial CSI report. The communications manager 1220 may be configured as or otherwise support a means for outputting a second message based on the partial CSI report.

By including or configuring the communications manager 1220 in accordance with examples as described herein, the device 1205 may support techniques for improved communication reliability, reduced latency, more efficient utilization of communication resources, and improved coordination between devices.

In some examples, the communications manager 1220 may be configured to perform various operations (e.g., receiving, obtaining, monitoring, outputting, transmitting) using or otherwise in cooperation with the transceiver 1210, the one or more of the antenna 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of techniques for spatial domain basis function refinement as described herein, or the processor 1235 and the memory 1225 may be otherwise configured to perform or support such operations.

Figure 13:
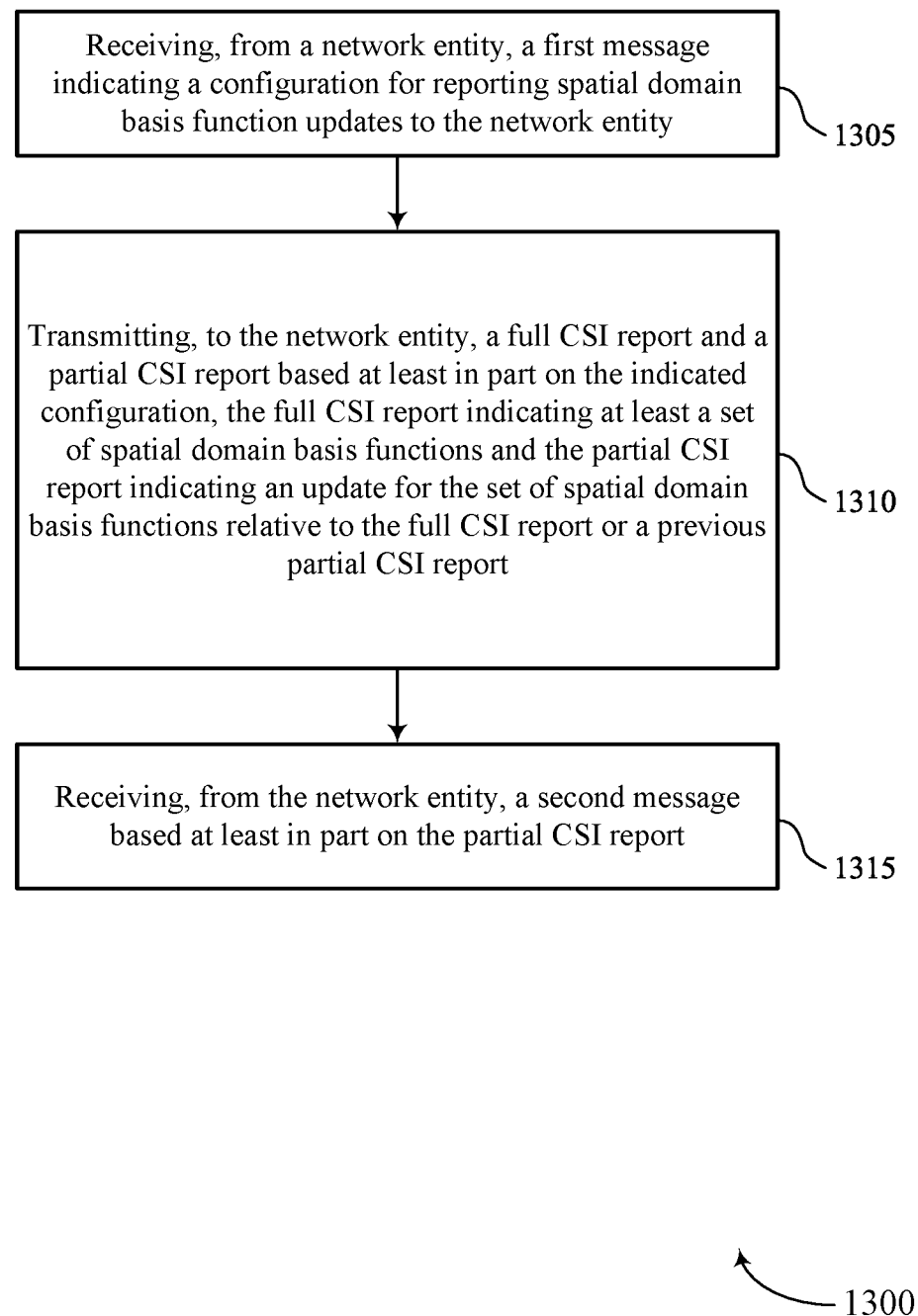
FIGS. 13 through 16 show flowcharts illustrating methods that support techniques for spatial domain basis function refinement in accordance with various aspects of the present disclosure.

FIG. 13 shows a flowchart illustrating a method 1300 that supports techniques for spatial domain basis function refinement in accordance with various aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving, from a network entity, a first message indicating a configuration for reporting spatial domain basis function updates to the network entity. The operations of 1305 may be performed in accordance with examples as disclosed herein. In some examples, aspects of the operations of 1305 may be performed by a configuration indication component 725 as described with reference to FIG. 7.

At 1310, the method may include transmitting, to the network entity, a full CSI report and a partial CSI report based on the indicated configuration, the full CSI report indicating at least a set of spatial domain basis functions and the partial CSI report indicating an update for the set of spatial domain basis functions relative to the full CSI report or a previous partial CSI report. The operations of 1310 may be performed in accordance with examples as disclosed herein. In some examples, aspects of the operations of 1310 may be performed by a CSI report component 730 as described with reference to FIG. 7.

At 1315, the method may include receiving, from the network entity, a second message based on the partial CSI report. The operations of 1315 may be performed in accordance with examples as disclosed herein. In some examples, aspects of the operations of 1315 may be performed by a message component 735 as described with reference to FIG. 7.

Figure 14:
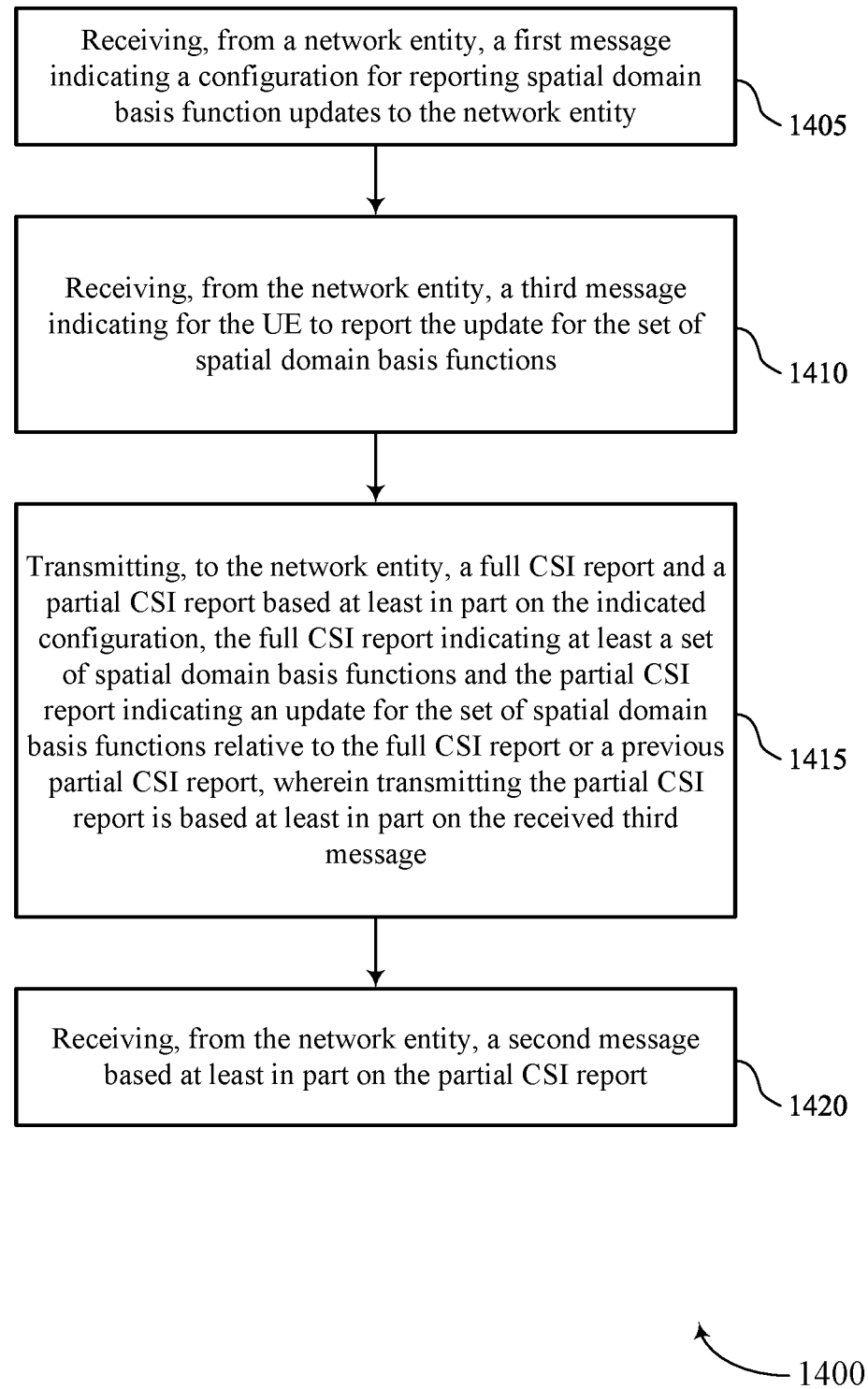

FIG. 14 shows a flowchart illustrating a method 1400 that supports techniques for spatial domain basis function refinement in accordance with various aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving, from a network entity, a first message indicating a configuration for reporting spatial domain basis function updates to the network entity. The operations of 1405 may be performed in accordance with examples as disclosed herein. In some examples, aspects of the operations of 1405 may be performed by a configuration indication component 725 as described with reference to FIG. 7.

At 1410, the method may include receiving, from the network entity, a third message indicating for the UE to report the update for the set of spatial domain basis functions. The operations of 1410 may be performed in accordance with examples as disclosed herein. In some examples, aspects of the operations of 1410 may be performed by an update indication component 740 as described with reference to FIG. 7.

At 1415, the method may include transmitting, to the network entity, a full CSI report and a partial CSI report based on the indicated configuration, the full CSI report indicating at least a set of spatial domain basis functions and the partial CSI report indicating an update for the set of spatial domain basis functions relative to the full CSI report or a previous partial CSI report, where transmitting the partial CSI report is based on the received third message. The operations of 1415 may be performed in accordance with examples as disclosed herein. In some examples, aspects of the operations of 1415 may be performed by a CSI report component 730 as described with reference to FIG. 7.

At 1420, the method may include receiving, from the network entity, a second message based on the partial CSI report. The operations of 1420 may be performed in accordance with examples as disclosed herein. In some examples, aspects of the operations of 1420 may be performed by a message component 735 as described with reference to FIG. 7.

Figure 15:
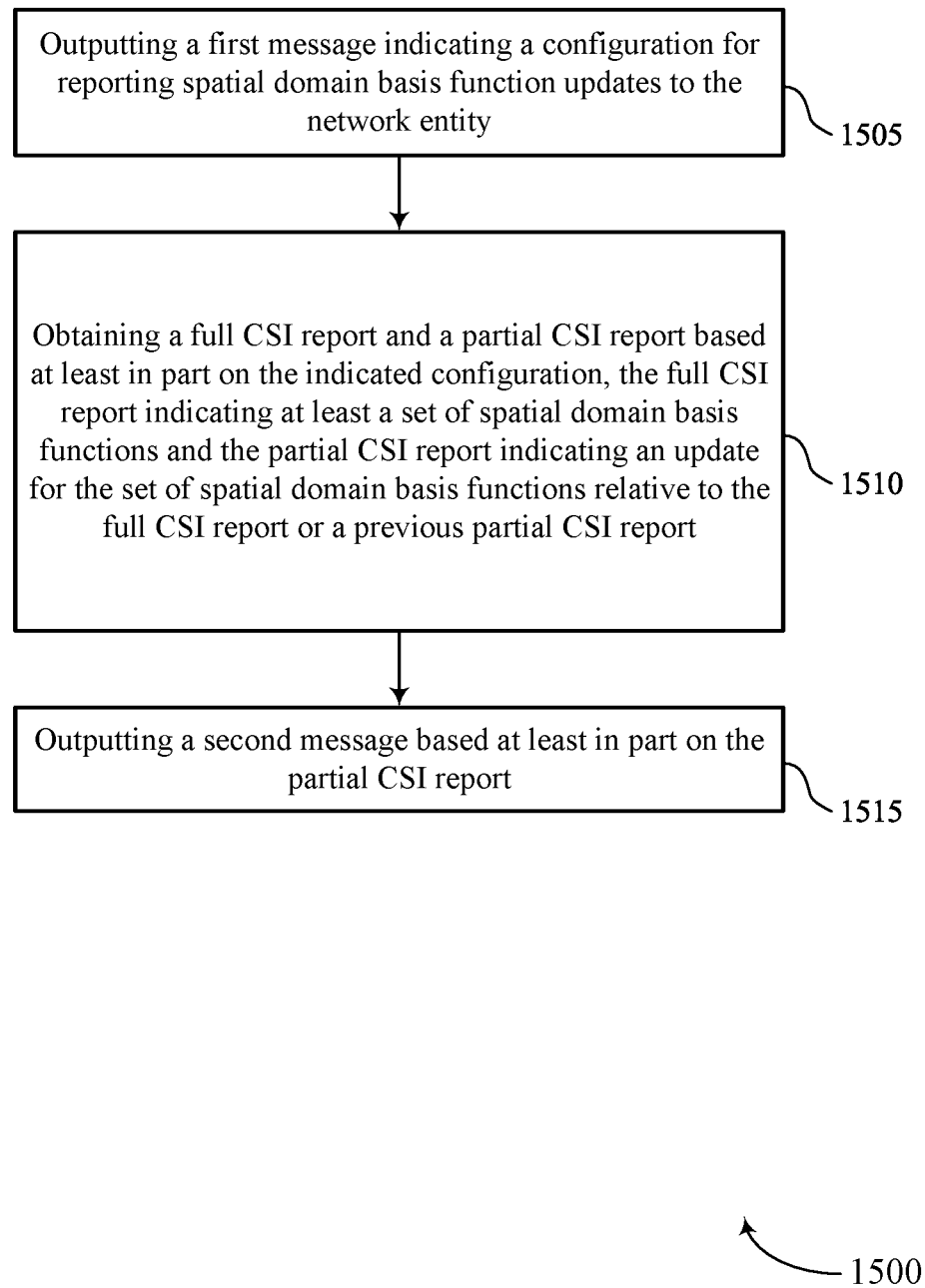

FIG. 15 shows a flowchart illustrating a method 1500 that supports techniques for spatial domain basis function refinement in accordance with various aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include outputting a first message indicating a configuration for reporting spatial domain basis function updates to the network entity.

The operations of 1505 may be performed in accordance with examples as disclosed herein. In some examples, aspects of the operations of 1505 may be performed by a configuration component 1125 as described with reference to FIG. 11.

At 1510, the method may include obtaining a full CSI report and a partial CSI report based on the indicated configuration, the full CSI report indicating at least a set of spatial domain basis functions and the partial CSI report indicating an update for the set of spatial domain basis functions relative to the full CSI report or a previous partial CSI report. The operations of 1510 may be performed in accordance with examples as disclosed herein. In some examples, aspects of the operations of 1510 may be performed by a report component 1130 as described with reference to FIG. 11.

At 1515, the method may include outputting a second message based on the partial CSI report. The operations of 1515 may be performed in accordance with examples as disclosed herein. In some examples, aspects of the operations of 1515 may be performed by a message output component 1135 as described with reference to FIG. 11.

Figure 16:
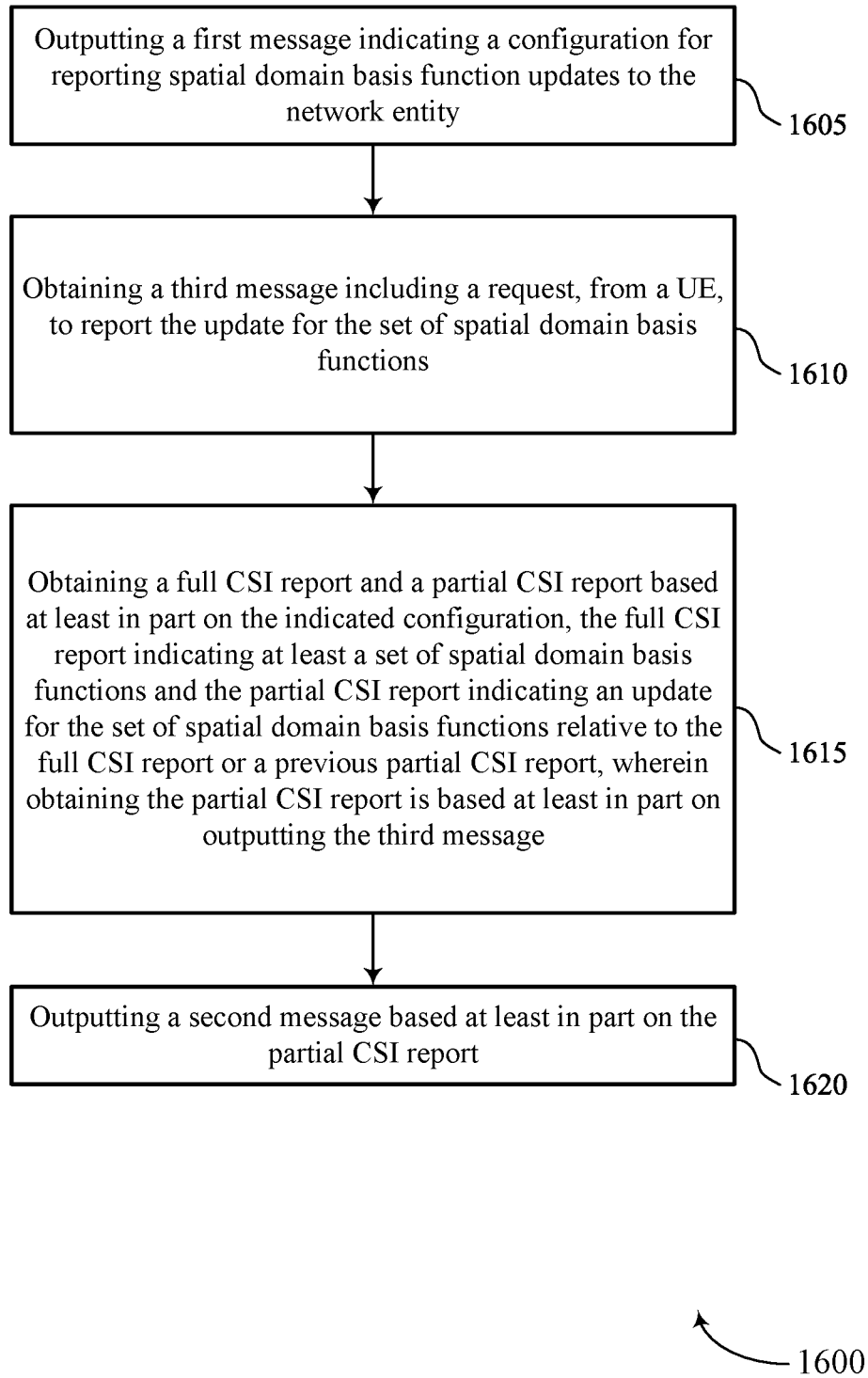

FIG. 16 shows a flowchart illustrating a method 1600 that supports techniques for spatial domain basis function refinement in accordance with various aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include outputting a first message indicating a configuration for reporting spatial domain basis function updates to the network entity. The operations of 1605 may be performed in accordance with examples as disclosed herein. In some examples, aspects of the operations of 1605 may be performed by a configuration component 1125 as described with reference to FIG. 11.

At 1610, the method may include obtaining a third message including a request, from a UE, to report the update for the set of spatial domain basis functions. The operations of 1610 may be performed in accordance with examples as disclosed herein. In some examples, aspects of the operations of 1610 may be performed by a report request component 1140 as described with reference to FIG. 11.

At 1615, the method may include obtaining a full CSI report and a partial CSI report based on the indicated configuration, the full CSI report indicating at least a set of spatial domain basis functions and the partial CSI report indicating an update for the set of spatial domain basis functions relative to the full CSI report or a previous partial CSI report, where obtaining the partial CSI report is based on outputting the third message. The operations of 1615 may be performed in accordance with examples as disclosed herein. In some examples, aspects of the operations of 1615 may be performed by a report component 1130 as described with reference to FIG. 11.

At 1620, the method may include outputting a second message based on the partial CSI report. The operations of 1620 may be performed in accordance with examples as disclosed herein. In some examples, aspects of the operations of 1620 may be performed by a message output component 1135 as described with reference to FIG. 11.

The following provides an overview of aspects of the present disclosure:

Aspect 1: A method for wireless communication at a UE, comprising: receiving, from a network entity, a first message indicating a configuration for reporting spatial domain basis function updates to the network entity; transmitting, to the network entity, a full CSI report and a partial CSI report based at least in part on the indicated configuration, the full CSI report indicating at least a set of spatial domain basis functions and the partial CSI report indicating an update for the set of spatial domain basis functions relative to the full CSI report or a previous partial CSI report; and receiving, from the network entity, a second message based at least in part on the partial CSI report.

Aspect 2: The method of aspect 1, further comprising: receiving, from the network entity, a third message indicating for the UE to report the update for the set of spatial domain basis functions, wherein transmitting the partial CSI report is based at least in part on the received third message.

Aspect 3: The method of any of aspects 1 through 2, wherein receiving the first message comprises: receiving an indication to report the update for the set of spatial domain basis functions relative to the full CSI report or the previous partial CSI report, wherein transmitting the partial CSI report indicating the update is based at least in part on the received indication.

Aspect 4: The method of any of aspects 1 through 3, further comprising: transmitting, to the network entity, a third message requesting to report the update for the set of spatial domain basis functions, wherein transmitting the partial CSI report is based at least in part on the transmitted third message.

Aspect 5: The method of any of aspects 1 through 4, wherein transmitting the partial CSI report comprises: transmitting an indication of a set of offsets to be applied to the set of spatial domain basis functions, wherein each offset of the set of offsets corresponds to a respective spatial domain basis function of the set of spatial domain basis functions, and wherein the set of offsets indicates the update for the set of spatial domain basis functions.

Aspect 6: The method of aspect 5, wherein each offset of the set of offsets identifies a first value corresponding to an azimuthal angle associated with the respective spatial domain basis function and a second value corresponding to a zenith angle associated with the respective spatial domain basis function.

Aspect 7: The method of any of aspects 1 through 4, wherein transmitting the partial CSI report comprises: transmitting an indication of a shift in a position of a set of coefficients associated with the set of spatial domain basis functions, wherein the shift in the position of the set of coefficients indicates the update for the set of spatial domain basis functions.

Aspect 8: The method of aspect 7, wherein the set of coefficients have a non-zero value.

Aspect 9: The method of any of aspects 7 through 8, wherein transmitting the indication of the shift in the position of the set of coefficients comprises: transmitting a set of bits indicating a value of an index corresponding to the shift in the position of the set of coefficients.

Aspect 10: The method of any of aspects 7 through 8, wherein transmitting the indication of the shift in the position of the set of coefficients comprises: transmitting an indication of a set of differential coefficients, wherein each differential coefficient of the set of differential coefficients correspond to a coefficient difference relative to a respective coefficient of the set of coefficients, and wherein the coefficient difference indicates a shift in a value and a shift in a position of the respective coefficient of the set of coefficients.

Aspect 11: The method of any of aspects 1 through 10, wherein transmitting the full CSI report and the partial CSI report comprises: transmitting the full CSI report at a first time instance and the partial CSI report at a second time instance subsequent to the first time instance, wherein the second time instance is based at least in part on a prediction performed at the UE.

Aspect 12: The method of aspect 11, wherein the prediction is based at least in part on a CSI measurement rate configured at the UE, a CSI reporting rate configured at the UE, or both.

Aspect 13: The method of any of aspects 1 through 4, 11, and 12, wherein transmitting the partial CSI report comprises: receiving, from the network entity, a third message indicating a plurality of sets of coefficients, wherein each set of coefficients of the indicated plurality of sets of coefficients corresponds to a respective set of spatial domain basis functions; and transmitting, to the network entity based at least in part on the received third message, an indication of one or more sets of coefficients of the indicated plurality of sets of coefficients, wherein the one or more sets of coefficients indicates the update for the set of spatial domain basis functions.

Aspect 14: The method of aspect 13, wherein transmitting the indication of the one or more sets of coefficients comprises: transmitting an indication of a set of differential coefficients, wherein each differential coefficient of the set of differential coefficients indicates a coefficient difference between a coefficient of a first set of coefficients of the indicated plurality of sets of coefficients and a respective coefficient of a second set of coefficients of the indicated plurality of sets of coefficients.

Aspect 15: A method for wireless communication at a network entity, comprising: outputting a first message indicating a configuration for reporting spatial domain basis function updates to the network entity; obtaining a full CSI report and a partial CSI report based at least in part on the indicated configuration, the full CSI report indicating at least a set of spatial domain basis functions and the partial CSI report indicating an update for the set of spatial domain basis functions relative to the full CSI report or a previous partial CSI report; and outputting a second message based at least in part on the partial CSI report.

Aspect 16: The method of aspect 15, further comprising: outputting a third message indicating for a UE to report the update for the set of spatial domain basis functions, wherein obtaining the partial CSI report is based at least in part on outputting the third message.

Aspect 17: The method of any of aspects 15 through 16, wherein outputting the first message comprises: outputting an indication for a UE to report the update for the set of spatial domain basis functions relative to the full CSI report or the previous partial CSI report, wherein obtaining the partial CSI report indicating the update is based at least in part on outputting the indication.

Aspect 18: The method of any of aspects 15 through 17, further comprising: obtaining a third message including a request, from a UE, to report the update for the set of spatial domain basis functions, wherein obtaining the partial CSI report is based at least in part on outputting the third message.

Aspect 19: The method of any of aspects 15 through 18, wherein obtaining the partial CSI report comprises: obtaining an indication of a set of offsets to be applied to the set of spatial domain basis functions, wherein each offset of the set of offsets corresponds to a respective spatial domain basis function of the set of spatial domain basis functions, and wherein the set of offsets indicates the update for the set of spatial domain basis functions.

Aspect 20: The method of aspect 19, wherein each offset of the set of offsets identifies a first value corresponding to an azimuthal angle associated with the respective spatial domain basis function and a second value corresponding to a zenith angle associated with the respective spatial domain basis function.

Aspect 21: The method of any of aspects 15 through 18, wherein obtaining the partial CSI report comprises: obtaining an indication of a shift in a position of a set of coefficients associated with the set of spatial domain basis functions, wherein the shift in the position of the set of coefficients indicates the update for the set of spatial domain basis functions.

Aspect 22: The method of aspect 21, wherein the set of coefficients have a non-zero value.

Aspect 23: The method of any of aspects 21 through 22, wherein obtaining the indication of the shift in the position of the set of coefficients comprises: obtaining a set of bits indicating a value of an index corresponding to the shift in the position of the set of coefficients.

Aspect 24: The method of any of aspects 21 through 22, wherein obtaining the indication of the shift in the position of the set of coefficients comprises: obtaining an indication of a set of differential coefficients, wherein each differential coefficient of the set of differential coefficients correspond to a coefficient difference relative to a respective coefficient of the set of coefficients, and wherein the coefficient difference indicates a shift in a value and a shift in a position of the respective coefficient of the set of coefficients.

Aspect 25: The method of any of aspects 15 through 24, wherein obtaining the full CSI report and the partial CSI report comprises: obtaining the full CSI report at a first time instance and the partial CSI report at a second time instance subsequent to the first time instance, wherein the second time instance is based at least in part on the first time instance and a prediction performed at a UE.

Aspect 26: The method of aspect 25, wherein the prediction is based at least in part on a CSI measurement rate configured at the UE, a CSI reporting rate configured at the UE, or both.

Aspect 27: The method of any of aspects 15 through 18, 25, and 26, wherein obtaining the partial CSI report comprises: outputting a third message indicating a plurality of sets of coefficients, wherein each set of coefficients of the indicated plurality of sets of coefficients corresponds to a respective set of spatial domain basis functions; and obtaining, based at least in part on outputting the third message, an indication of one or more sets of coefficients of the indicated plurality of sets of coefficients, wherein the one or more sets of coefficients indicates the update for the set of spatial domain basis functions.

Aspect 28: The method of aspect 27, wherein obtaining the indication of the one or more sets of coefficients comprises: obtaining an indication of a set of differential coefficients, wherein each differential coefficient of the set of differential coefficients indicates a coefficient difference between a coefficient of a first set of coefficients of the indicated plurality of sets of coefficients and a respective coefficient of a second set of coefficients of the indicated plurality of sets of coefficients.

Aspect 29: An apparatus for wireless communication at a UE, comprising a processor; memory coupled with the processor; and instructions stored in the memory and executable by the processor to cause the apparatus to perform a method of any of aspects 1 through 14.

Aspect 30: An apparatus for wireless communication at a UE, comprising at least one means for performing a method of any of aspects 1 through 14.

Aspect 31: A non-transitory computer-readable medium storing code for wireless communication at a UE, the code comprising instructions executable by a processor to perform a method of any of aspects 1 through 14.

Aspect 32: An apparatus for wireless communication at a network entity, comprising a processor; memory coupled with the processor; and instructions stored in the memory and executable by the processor to cause the apparatus to perform a method of any of aspects 15 through 28.

Aspect 33: An apparatus for wireless communication at a network entity, comprising at least one means for performing a method of any of aspects 15 through 28.

Aspect 34: A non-transitory computer-readable medium storing code for wireless communication at a network entity, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
receiving, from a network entity, a first message indicating a configuration for reporting spatial domain basis function updates to the network entity;
receiving, from the network entity, a third message indicating for the UE to report an update for at least a set of spatial domain basis functions;
transmitting, to the network entity, a full channel state information report and a partial channel state information report based at least in part on the indicated configuration, the full channel state information report indicating the at least the set of spatial domain basis functions and the partial channel state information report indicating the update for the at least the set of spatial domain basis functions relative to the full channel state information report or a previous partial channel state information report, wherein transmitting the partial channel state information report is based at least in part on receiving the third message; and
receiving, from the network entity, a second message based at least in part on the partial channel state information report.

2. The method of claim 1, wherein receiving the first message comprises:
receiving an indication to report the update for the set of spatial domain basis functions relative to the full channel state information report or the previous partial channel state information report, wherein transmitting the partial channel state information report indicating the update is based at least in part on the received indication.

3. The method of claim 1, further comprising:
transmitting, to the network entity, a third message requesting to report the update for the set of spatial domain basis functions, wherein transmitting the partial channel state information report is based at least in part on the transmitted third message.

4. The method of claim 1, wherein transmitting the partial channel state information report comprises:
transmitting an indication of a set of offsets to be applied to the set of spatial domain basis functions, wherein each offset of the set of offsets corresponds to a respective spatial domain basis function of the set of spatial domain basis functions, and wherein the set of offsets indicates the update for the set of spatial domain basis functions.

5. The method of claim 4, wherein each offset of the set of offsets identifies a first value corresponding to an azimuthal angle associated with the respective spatial domain basis function and a second value corresponding to a zenith angle associated with the respective spatial domain basis function.

6. The method of claim 1, wherein transmitting the partial channel state information report comprises:
transmitting an indication of a shift in a position of a set of coefficients associated with the set of spatial domain basis functions, wherein the shift in the position of the set of coefficients indicates the update for the set of spatial domain basis functions.

7. The method of claim 6, wherein the set of coefficients have a non-zero value.

8. The method of claim 6, wherein transmitting the indication of the shift in the position of the set of coefficients comprises:
transmitting a set of bits indicating a value of an index corresponding to the shift in the position of the set of coefficients.

9. The method of claim 6, wherein transmitting the indication of the shift in the position of the set of coefficients comprises:
transmitting an indication of a set of differential coefficients, wherein each differential coefficient of the set of differential coefficients correspond to a coefficient difference relative to a respective coefficient of the set of coefficients, and wherein the coefficient difference indicates a shift in a value and a shift in a position of the respective coefficient of the set of coefficients.

10. The method of claim 1, wherein transmitting the full channel state information report and the partial channel state information report comprises:
transmitting the full channel state information report at a first time instance and the partial channel state information report at a second time instance subsequent to the first time instance, wherein the second time instance is based at least in part on a prediction performed at the UE.

11. The method of claim 10, wherein the prediction is based at least in part on a channel state information measurement rate configured at the UE, a channel state information reporting rate configured at the UE, or both.

12. The method of claim 1, wherein transmitting the partial channel state information report comprises:
receiving, from the network entity, a third message indicating a plurality of sets of coefficients, wherein each set of coefficients of the indicated plurality of sets of coefficients corresponds to a respective set of spatial domain basis functions; and
transmitting, to the network entity based at least in part on the received third message, an indication of one or more sets of coefficients of the indicated plurality of sets of coefficients, wherein the one or more sets of coefficients indicates the update for the set of spatial domain basis functions.

13. The method of claim 12, wherein transmitting the indication of the one or more sets of coefficients comprises:
transmitting an indication of a set of differential coefficients, wherein each differential coefficient of the set of differential coefficients indicates a coefficient difference between a coefficient of a first set of coefficients of the indicated plurality of sets of coefficients and a respective coefficient of a second set of coefficients of the indicated plurality of sets of coefficients.

14. A method for wireless communication at a network entity, comprising:

outputting a first message indicating a configuration for reporting spatial domain basis function updates to the network entity;

outputting a third message indicating for a user equipment (UE) to report an update for at least a set of spatial domain basis functions;

obtaining a full channel state information report and a partial channel state information report based at least in part on the indicated configuration, the full channel state information report indicating the at least the set of spatial domain basis functions and the partial channel state information report indicating the update for the at least the set of spatial domain basis functions relative to the full channel state information report or a previous partial channel state information report, wherein obtaining the partial channel state information report is based at least in part on outputting the third message; and outputting a second message based at least in part on the partial channel state information report.

15. The method of claim 14, wherein outputting the first message comprises:

outputting an indication for a user equipment (UE) to report the update for the set of spatial domain basis functions relative to the full channel state information report or the previous partial channel state information report, wherein obtaining the partial channel state information report indicating the update is based at least in part on outputting the indication.

16. The method of claim 14, further comprising:

obtaining a third message including a request, from a user equipment (UE), to report the update for the set of spatial domain basis functions, wherein obtaining the partial channel state information report is based at least in part on outputting the third message.

17. The method of claim 14, wherein obtaining the partial channel state information report comprises:

obtaining an indication of a set of offsets to be applied to the set of spatial domain basis functions, wherein each offset of the set of offsets corresponds to a respective spatial domain basis function of the set of spatial domain basis functions, and wherein the set of offsets indicates the update for the set of spatial domain basis functions.

18. The method of claim 17, wherein each offset of the set of offsets identifies a first value corresponding to an azimuthal angle associated with the respective spatial domain basis function and a second value corresponding to a zenith angle associated with the respective spatial domain basis function.

19. The method of claim 14, wherein obtaining the partial channel state information report comprises:

obtaining an indication of a shift in a position of a set of coefficients associated with the set of spatial domain basis functions, wherein the shift in the position of the set of coefficients indicates the update for the set of spatial domain basis functions.

20. The method of claim 19, wherein the set of coefficients have a non-zero value.

21. The method of claim 19, wherein obtaining the indication of the shift in the position of the set of coefficients comprises:

obtaining a set of bits indicating a value of an index corresponding to the shift in the position of the set of coefficients.

22. The method of claim 19, wherein obtaining the indication of the shift in the position of the set of coefficients comprises:

obtaining an indication of a set of differential coefficients, wherein each differential coefficient of the set of differential coefficients correspond to a coefficient difference relative to a respective coefficient of the set of coefficients, and wherein the coefficient difference indicates a shift in a value and a shift in a position of the respective coefficient of the set of coefficients.

23. The method of claim 14, wherein obtaining the full channel state information report and the partial channel state information report comprises:

obtaining the full channel state information report at a first time instance and the partial channel state information report at a second time instance subsequent to the first time instance, wherein the second time instance is based at least in part on the first time instance and a prediction performed at a user equipment (UE).

24. The method of claim 23, wherein the prediction is based at least in part on a channel state information measurement rate configured at the UE, a channel state information reporting rate configured at the UE, or both.

25. The method of claim 14, wherein obtaining the partial channel state information report comprises:

outputting a third message indicating a plurality of sets of coefficients, wherein each set of coefficients of the indicated plurality of sets of coefficients corresponds to a respective set of spatial domain basis functions; and obtaining, based at least in part on outputting the third message, an indication of one or more sets of coefficients of the indicated plurality of sets of coefficients, wherein the one or more sets of coefficients indicates the update for the set of spatial domain basis functions.

26. The method of claim 25, wherein obtaining the indication of the one or more sets of coefficients comprises:

obtaining an indication of a set of differential coefficients, wherein each differential coefficient of the set of differential coefficients indicates a coefficient difference between a coefficient of a first set of coefficients of the indicated plurality of sets of coefficients and a respective coefficient of a second set of coefficients of the indicated plurality of sets of coefficients.

27. An apparatus for wireless communication at a user equipment (UE), comprising:

a processor;

memory coupled with the processor; and instructions stored in the memory and executable by the processor to cause the apparatus to:

receive, from a network entity, a first message indicating a configuration for reporting spatial domain basis function updates to the network entity;

receive, from the network entity, a third message indicating for the UE to report an update for at least a set of spatial domain basis functions;

transmit, to the network entity, a full channel state information report and a partial channel state information report based at least in part on the indicated configuration, the full channel state information report indicating the at least the set of spatial domain basis functions and the partial channel state information report indicating the update for the at least the set of spatial domain basis functions relative to the full channel state information report or a previous partial channel state information report, wherein transmitting the partial channel state information report is based at least in part on receiving the third message; and receive, from the network entity, a second message based at least in part on the partial channel state information report.

28. An apparatus for wireless communication at a network entity, comprising:

a processor;

memory coupled with the processor; and instructions stored in the memory and executable by the processor to cause the apparatus to:

output a first message indicating a configuration for reporting spatial domain basis function updates to the network entity;

output a third message indicating for a user equipment (UE) to report an update for at least a set of spatial domain basis functions;

obtain a full channel state information report and a partial channel state information report based at least in part on the indicated configuration, the full channel state information report indicating the at least the set of spatial domain basis functions and the partial channel state information report indicating the update for the at least the set of spatial domain basis functions relative to the full channel state information report or a previous partial channel state information report, wherein obtain the partial channel state information report is based at least in part on outputting the third message; and output a second message based at least in part on the partial channel state information report.

* * * * *